(12) United States Patent
Matsuzawa et al.

(10) Patent No.: US 7,747,101 B2
(45) Date of Patent: Jun. 29, 2010

(54) LENS EVALUATION DEVICE

(75) Inventors: Toshiaki Matsuzawa, Tokyo (JP); Go Ryu, Kawasaki (JP); Yukio Eda, Tokyo (JP); Terumasa Morita, Tokyo (JP)

(73) Assignee: Olympus Corporation, Tokyo (JP)

( * ) Notice: Subject to any disclaimer, the term of this patent is extended or adjusted under 35 U.S.C. 154(b) by 898 days.

(21) Appl. No.: 11/598,446

(22) Filed: Nov. 13, 2006

(65) Prior Publication Data
US 2007/0115457 A1 May 24, 2007

(30) Foreign Application Priority Data

| Nov. 15, 2005 | (JP) | 2005-330451 |
| Jul. 21, 2006 | (JP) | 2006-199640 |
| Sep. 25, 2006 | (JP) | 2006-259189 |

(51) Int. Cl.
*G06K 9/40* (2006.01)
*G01B 9/00* (2006.01)
(52) U.S. Cl. .................. 382/275; 356/124
(58) Field of Classification Search ........... 382/254, 382/255, 274, 275, 291, 305, 312; 356/121, 356/124, 345, 400; 359/19
See application file for complete search history.

(56) References Cited

U.S. PATENT DOCUMENTS

| 3,904,294 | A | * | 9/1975 | Gold et al. ............... 356/124.5 |
| 4,641,962 | A | * | 2/1987 | Sueda et al. .............. 356/124 |
| 5,402,224 | A | | 3/1995 | Hirukawa et al. |
| 5,541,731 | A | * | 7/1996 | Freedenberg et al. ....... 356/496 |
| 5,661,816 | A | | 8/1997 | Fantone et al. |
| 5,696,581 | A | * | 12/1997 | Kubota et al. ............ 356/124.5 |
| 5,844,672 | A | | 12/1998 | Kwon |
| 6,560,034 | B2 | * | 5/2003 | Maruyama et al. .......... 359/669 |
| 6,597,442 | B2 | * | 7/2003 | Maeda et al. .............. 356/124 |
| 6,693,704 | B1 | * | 2/2004 | Ooki et al. ............... 356/121 |
| 6,788,401 | B1 | | 9/2004 | Kitabayashi et al. |
| 6,816,247 | B1 | | 11/2004 | Heppner et al. |
| 7,111,938 | B2 | * | 9/2006 | Andino et al. ............ 351/212 |
| 2002/0015158 | A1 | | 2/2002 | Shiode et al. |
| 2002/0057345 | A1 | | 5/2002 | Tamaki et al. |
| 2004/0212680 | A1 | | 10/2004 | Schroeder et al. |
| 2005/0203619 | A1 | * | 9/2005 | Altmann ................... 623/6.23 |

FOREIGN PATENT DOCUMENTS

EP 1 248 093 A1 10/2002

(Continued)

OTHER PUBLICATIONS

Japanese Patent Abstract of Japan for Japanese Publication No. 05-190423, published Jul. 30, 1993.

(Continued)

*Primary Examiner*—Kanji Patel
(74) *Attorney, Agent, or Firm*—Scully, Scott, Murphy & Presser, P.C.

(57) ABSTRACT

This lens evaluation device comprises a plurality of point light sources arranged on the plane, an imaging unit for picking up an object and obtaining its image, a movement unit for changing the relative distance between the point light source or the imaging unit and the optical system to be evaluated, a storage medium for recording stack images obtained by the imaging unit picking up the images of the plurality of point light sources via the optical system every time the movement unit changes the relative distance, an image position calculation unit for calculating a plurality of image positions from the plurality of pieces of point light source image in the stack image recorded on the storage medium and an aberration acquisition unit for fitting an aberration model function to the plurality of image positions calculated and obtaining an aberration measurement value.

52 Claims, 14 Drawing Sheets

FOREIGN PATENT DOCUMENTS

| | | |
|---|---|---|
| JP | 01-270605 | 10/1989 |
| JP | 6-21772 | 3/1994 |
| JP | 2002-289494 | 10/2002 |
| JP | 3391470 | 1/2003 |
| JP | 2004-163207 | 6/2004 |
| JP | 2006-195789 | 7/2006 |
| JP | 2006-195790 | 7/2006 |
| WO | WO 97/15898 | 5/1997 |
| WO | WO 03/091685 A1 | 11/2003 |

OTHER PUBLICATIONS

Japanese Patent Abstract of Japan for Japanese Publication No. 02-206707, published Aug. 16, 1990.

"Image Correction for Highly Accurate Image Measurement Using Digital Image", by Nakamura et al., Journal of the Electronic Image Association, vol. 31, No. 4, pp. 534-541 (Jul. 25, 2002).

Zhengyou Zhang, "A Flexible Technique for Camera Calibration", Mircosoft Research.

Zhengyou Zhang, "A Flexible Technique for Camera Calibration", IEEE Transitions on Pattern Analysis and Machine Intelligence, vol. 22, No. 11.

Dongsheng Zhang, et al., "Displacement/strain measurements using an optical microscope and digital image correlation", Optical Engineering, vol. 45 (3).

William H. Press et al., "Numerical Recipes in C: The Art of Scientific Computing Second Edition", Cambridge University Press.

Full English machine translation of JP 2004-163207 (previously submitted in applicants' Information Disclosure Statement filed Nov. 13, 2006).

Chinese Office Action dated Feb. 12, 2010 together with English translation.

* cited by examiner

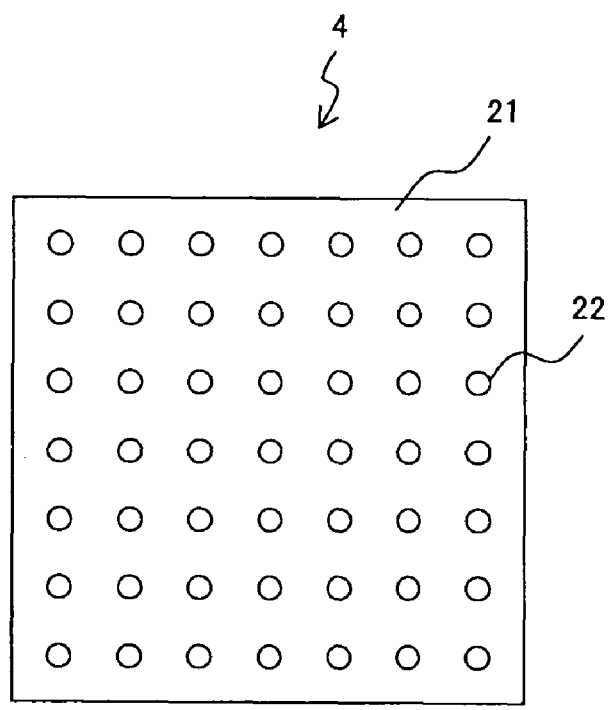
F I G. 3

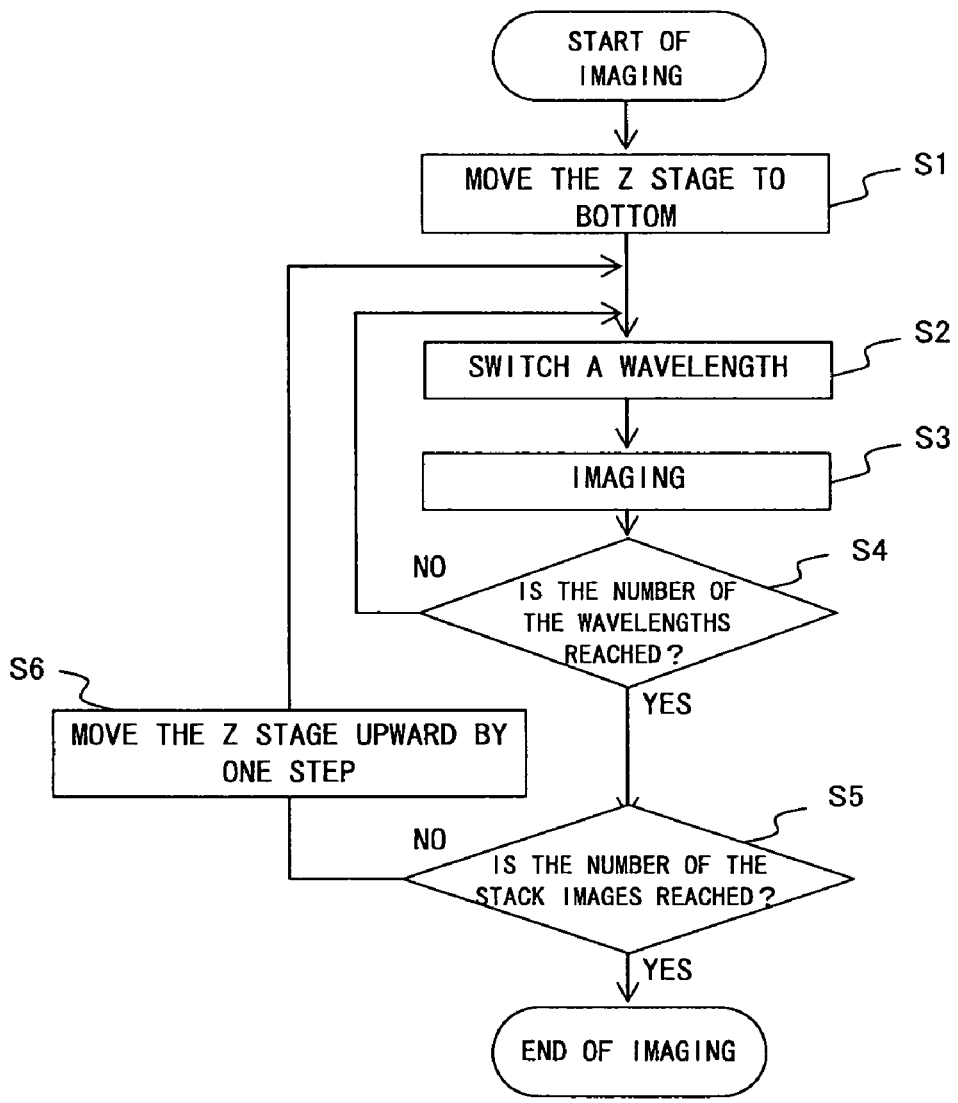
F I G. 4

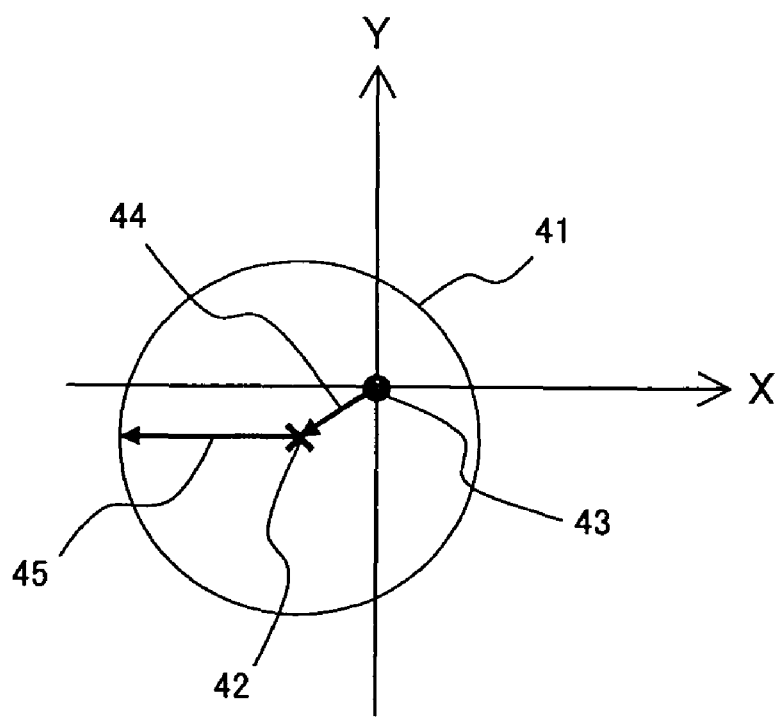
F I G. 9

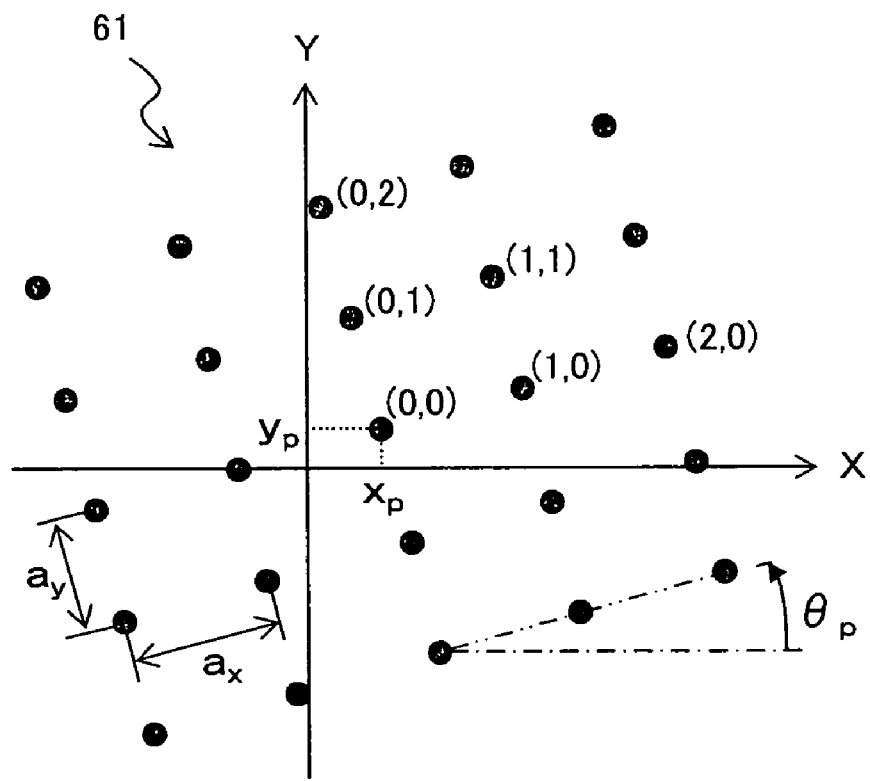
F I G. 10

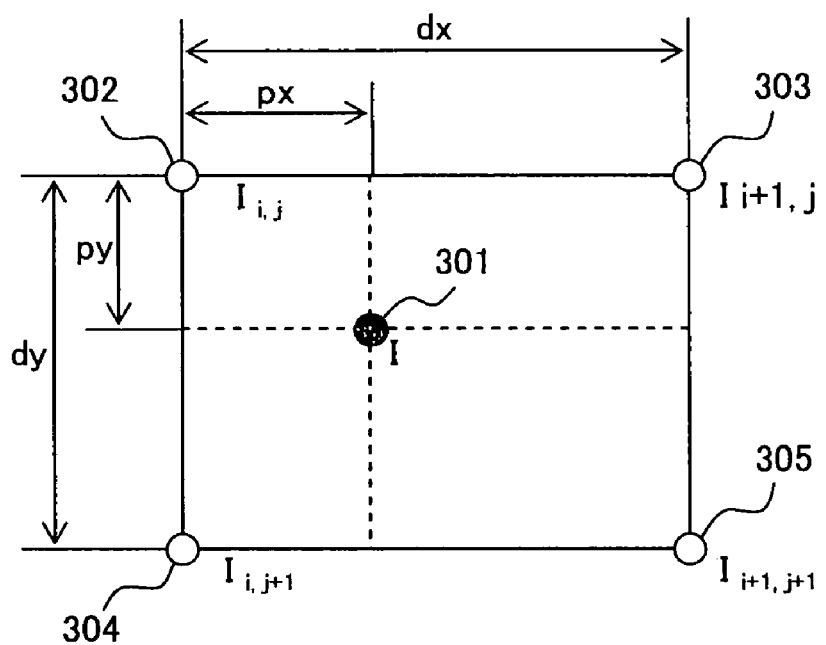
F I G. 13

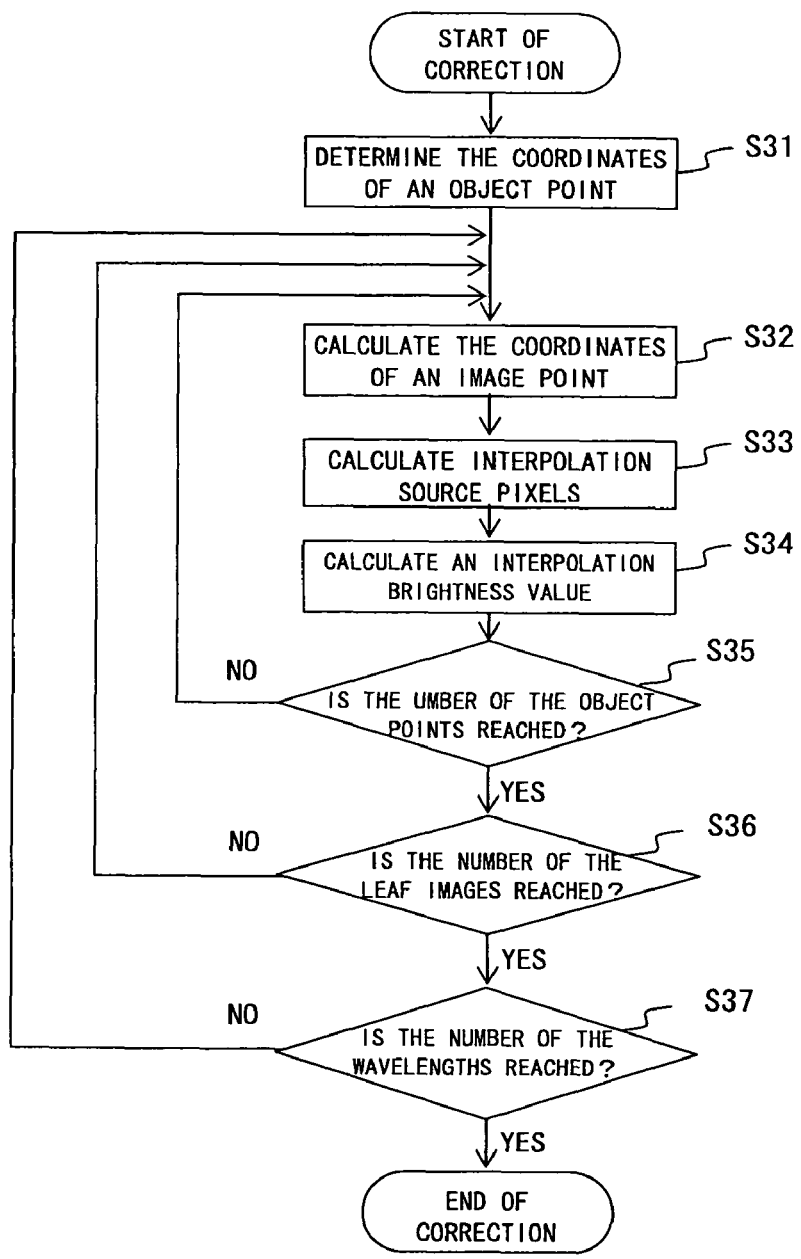
F I G. 14

LENS EVALUATION DEVICE

CROSS REFERENCE TO RELATED APPLICATIONS

This application is based upon and claims the benefit of priority from the prior Japanese Patent Applications No. 2005-330451, filed Nov. 15, 2005, 2006-199640, filed Jul. 21, 2006, 2006-259189, filed Sep. 25, 2006, the entire contents of which are incorporated herein by reference.

BACKGROUND OF THE INVENTION

1. Field of the Invention

The present invention relates to a lens evaluation device, and more particularly to a lens evaluation device for evaluating the performance related to an image position of an optical system, specifically lateral magnification, distortion aberration, field curvature and chromatic aberration.

2. Description of the Related Art

When measuring an optically picked-up image, highly accurate optical aberration correction is necessary. For example, in the case of a laser confocal microscope, a depth direction cannot be accurately measured since the observation image of a flat sample curves if there is field curvature. Or when picking up images by laser with a plurality of wavelengths and comparing them, an image position slides in a lateral direction (direction perpendicular to the optical axis of the optical system) and a longitudinal direction (the optical axis direction of the optical system) depending on a wavelength if there is chromatic aberration in the optical system. Therefore, accurate comparison/operation is impossible. Similarly, the error of the lateral magnification and distortion aberration cause errors in the measurement of the image position. In order to correct these errors, such aberration is measured in advance and a picked-up image must be modified by the measured aberration. Alternatively, the lens position of the optical system is modified by the measured aberration and the aberration must be reduced to sufficiently small. In such a case, an evaluation device capable of measuring the performance related to an image position of the optical system, specifically lateral magnification, distortion aberration, field curvature and chromatic aberration with high accuracy is indispensable.

The conventional evaluation device is described below with reference to FIG. 1.

As shown in FIG. 1, in the conventional evaluation device, a pin-hole 51, which becomes a point light source, is installed on the object surface of an optical system 52 to be evaluated and is illuminated from behind by an illumination means, which is not shown in FIG. 1. The aerial image 53 of the pin-hole 51 is formed on the image surface of the optical system 52. However, since this aerial image 53 is small, an image position with the maximum intensity cannot be measured with sufficient accuracy even if the aerial image is directly picked up by an imaging device. Therefore, its image enlarged by an enlargement optical system 54 is picked up by the imaging device 55. Thus, its image position can be determined by retrieving a pixel with the maximum brightness from the enlarge image. Furthermore, if the image is picked up while moving the enlargement optical system 54 and the imaging device 55 in the optical axis direction (Z axis direction) of the optical system 52 and a pixel with the maximum brightness is retrieved from its stack image, the X, Y and Z coordinates of the image position can be determined. By switching the wavelength of the illumination means, chromatic aberration can also be evaluated. However, in order to calculate the X, Y and Z coordinates of the image position, the respective positions of the enlargement optical system 54 and the imaging device 55 must be monitored by three pieces of length meter. In order to determine the shape of the entire object within the view field, the image must be measured while moving the pin-hole 51 to a plurality of positions on the object surface. In this case, the X, Y and Z coordinates of the pin-hole 51 must also be monitored by the length meter.

As the prior art related to the lens evaluation device in this technical field, there are Patent references 1-5 and Non-patent reference 1.

Patent reference 1: Japanese Patent No. 3391470
Patent reference 2: Japanese Patent Application No. 2002-289494
Patent reference 3: Japanese Patent Application No. 2004-163207
Patent reference 4: Japanese Patent Application Publication No. H6-21772
Patent reference 5: Japanese Patent Application No. H1-270605
Non-patent reference 1: "Image Correction for Highly Accurate Image Measurement Using Digital Image", by Nakamura et al., Journal of the Electronic Image Association, Vol. 31, No. 4, pages 534-541 (Jul. 25, 2002).

SUMMARY OF THE INVENTION

The lens evaluation device in the first aspect of the present invention comprises a plurality of point light sources arrayed on a flat surface, an imaging unit for picking up an object and obtaining the image, a movement unit for changing the relative distance between the point light source or the imaging unit and an optical system to be evaluated, a storage medium on which is recorded a stack image obtained by the imaging unit picking up the images of the plurality of point light sources via the optical system every time the movement unit changes the relative distance, an image position calculation unit for calculating a plurality of image positions from the plurality of point light source images in the stack image recorded on the storage medium and an aberration acquisition unit for fitting an aberration model function to the plurality of image positions calculated by the image position calculation unit and obtaining an aberration measurement value.

The optical device for picking up the image of an object in the second aspect of the present invention is provided with the lens evaluation device in the first aspect. The optical device comprises an image correction unit for correcting the distortion and/or color deviation of the image by the obtained aberration measurement value.

The present invention is not limited to the lens evaluation device and the optical device. For example, the lens evaluation device can also be constituted as a lens evaluation method or a storage medium on which are recorded the lens evaluation program.

BRIEF DESCRIPTION OF THE DRAWINGS

FIG. 3 shows a pin-hole array specimen;
FIG. 4 is a flowchart showing the picking-up of a stack image.

FIG. 9 shows the operation of the rotation unit of the lens evaluation device;

FIG. 10 shows how to calculate an object point position;

FIG. 13 shows an interpolation method used to correct an image; and

FIG. 14 is a flowchart showing the correction of an image.

DESCRIPTION OF THE PREFERRED EMBODIMENTS

The preferred embodiments of the present invention are described below with reference to the drawings.

Figure 1:
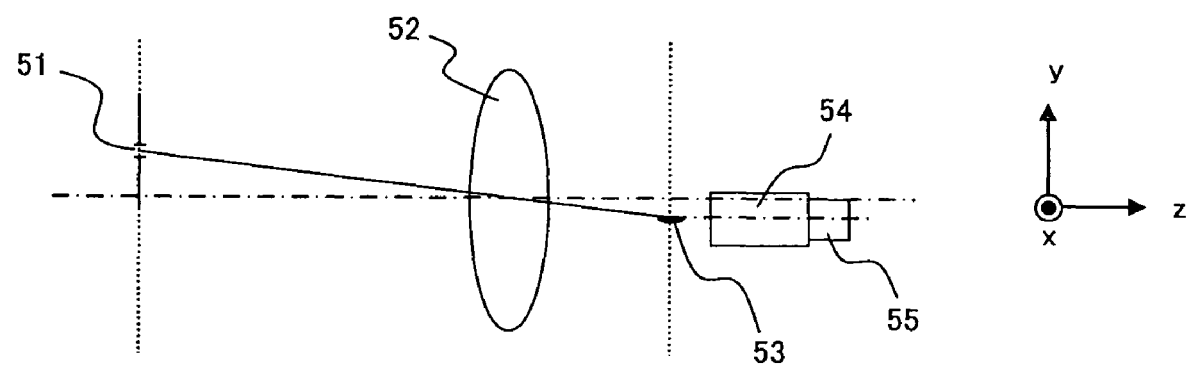
FIG. 1 shows the conventional evaluation device.
Figure 2:
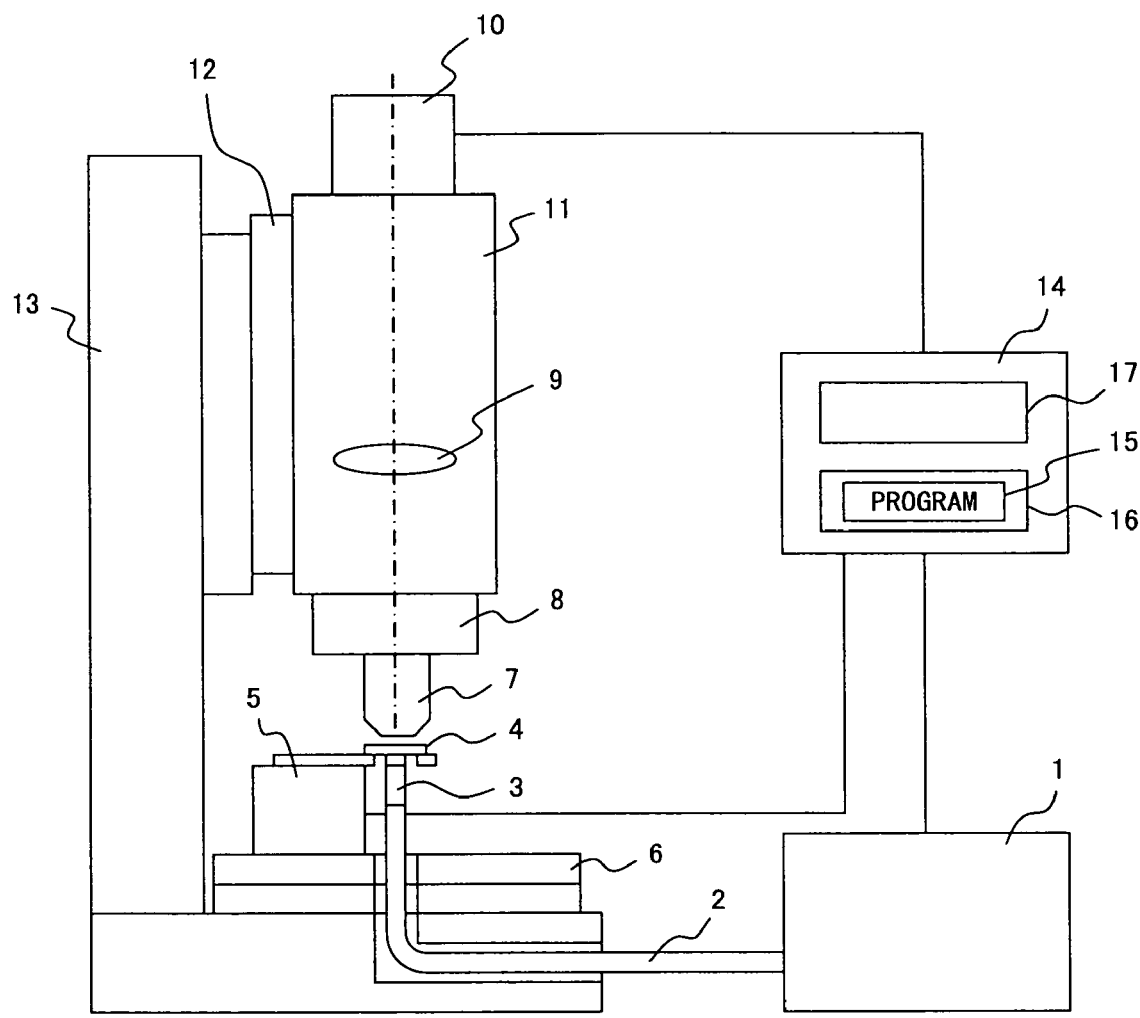
FIG. 2 shows the side view of the lens evaluation device in the first preferred embodiment and the block diagram of its control system.
Figure 5:
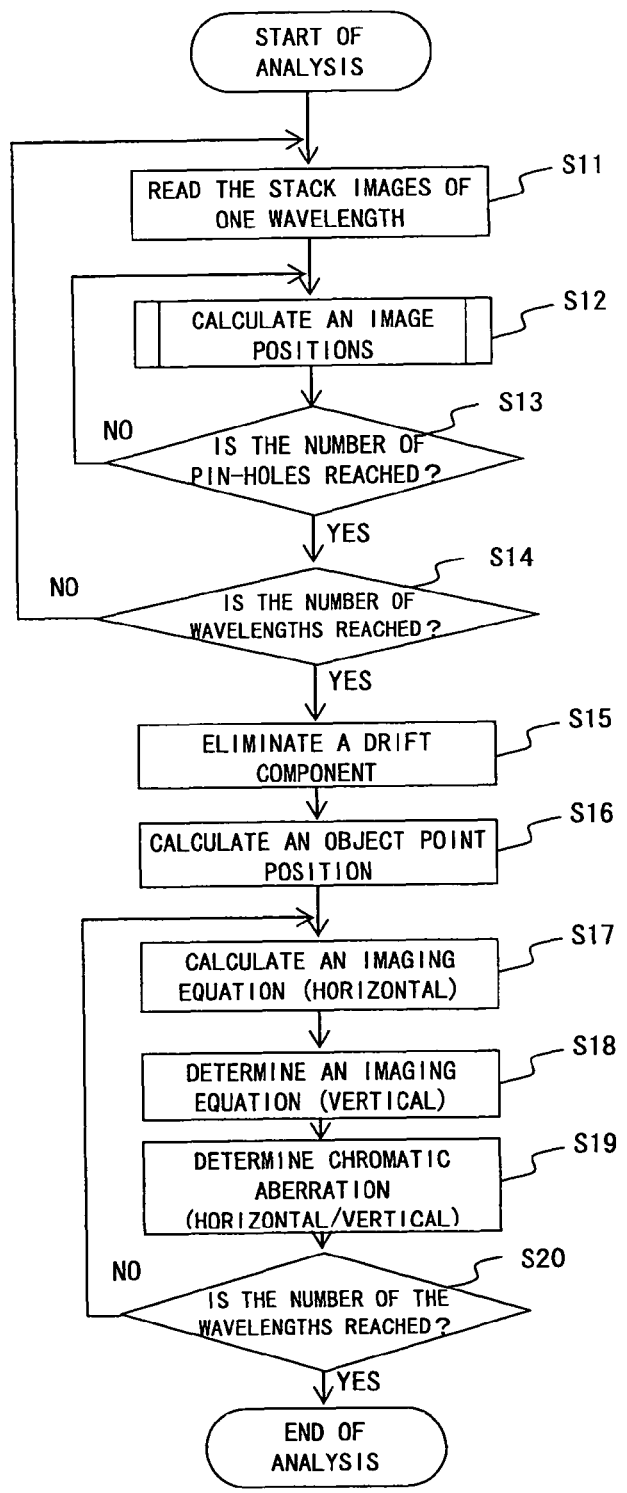
FIG. 5 is a flowchart showing how to calculate aberration.
Figure 6:
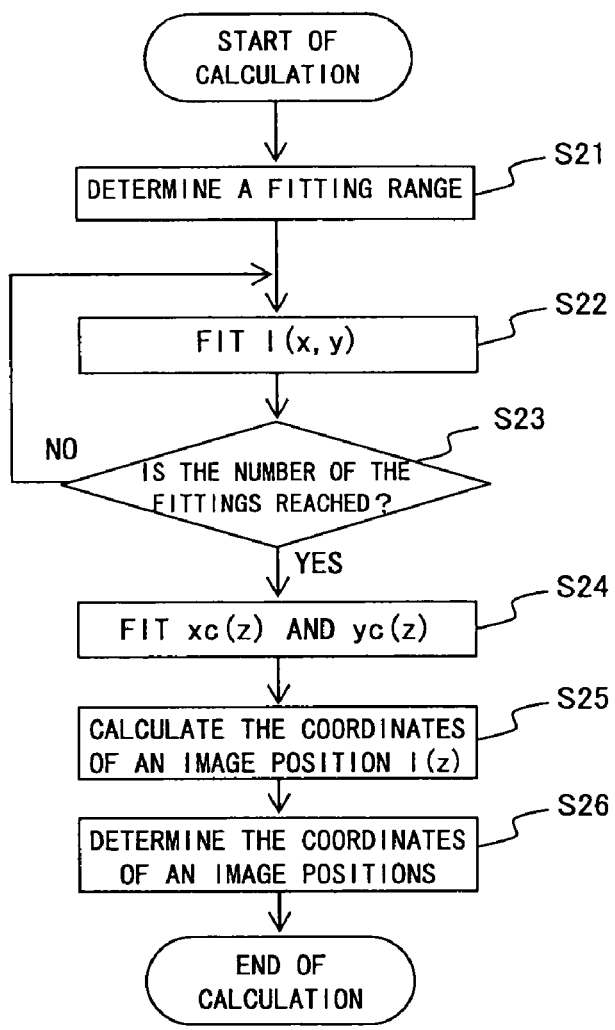
FIG. 6 is a flowchart showing how to calculate an image position.
Figure 7:
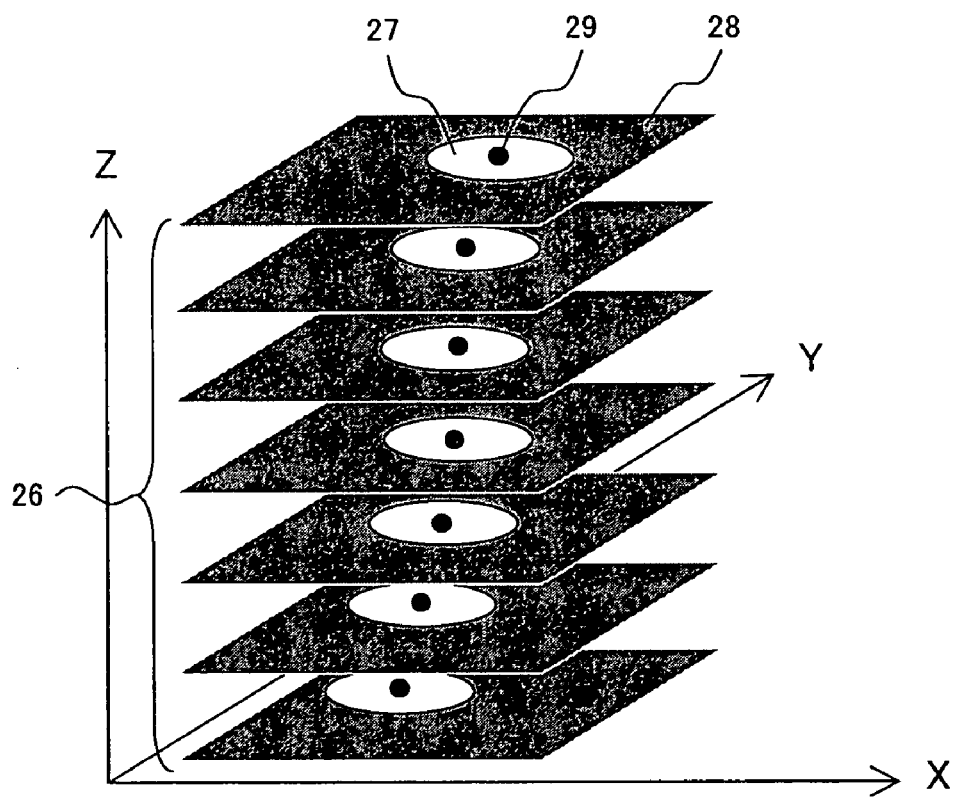
FIG. 7 shows how to calculate an image position.
Figure 8:
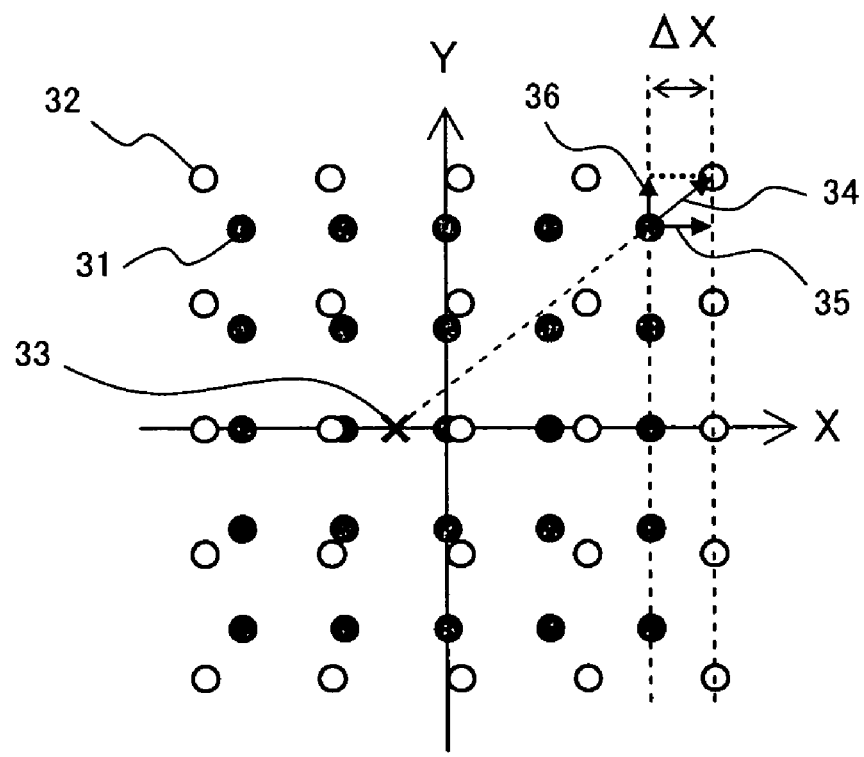
FIG. 8 shows the chromatic aberration in the lateral direction.

FIGS. 2 through 9 and 10 show the lens evaluation device for evaluating the microscopic optical system in the first preferred embodiment of the present invention. FIG. 2 shows the side view of the lens evaluation device in the first preferred embodiment and the block diagram of its control system. FIG. 3 shows a pin-hole array specimen. FIG. 4 is a flowchart showing the picking-up of a stack image. FIG. 5 is a flowchart showing how to calculate aberration. FIG. 6 is a flowchart showing how to calculate an image position. FIG. 7 shows how to calculate an image position. FIG. 8 shows the chromatic aberration in the lateral direction. FIG. 9 shows the operation of the rotation unit of the lens evaluation device. FIG. 10 shows how to calculate an object point position.

In FIG. 2, a light source 1 includes an incandescent light source, a wavelength selection means and a light amount adjustment means inside. For the incandescent light source, a halogen lamp, a xenon lamp, a LED or the like, is used. The wavelength selection means is a rotary holder capable of selecting one from a plurality of interference filters and installing it in an optical path. The light amount adjustment means, which is not shown in FIG. 2, is, for example, a rotary ND filter capable of consecutively changing transmittance in the range between 0 and 100%. The wavelength selection means and the light amount adjustment means, which are not shown in FIG. 2, can be controlled by an external control signal and can arbitrarily set (select/switch) the center wavelength and intensity of light to be outputted. Alternatively, the wavelength selection means can be replaced with another spectral means or a plurality of light sources each with a different wavelength can be switched.

Light from the light source 1 is led via an optical fiber 2, the position/angle distribution of its intensity is unified by an optical intensity unification unit 3 and the light transmits through and illuminates a sample 4. The Optical intensity unification unit 3 is composed of rod glass, a diffusion plate or the like that repeats reflection inside.

The sample 4 is a pin-hole array specimen as shown in FIG. 3. Pin-holes 22 are opened on an opaque metal film 21 evaporated on a glass substrate in a lattice shape at equal horizontal/vertical intervals. The diameters of all the pin-holes are the same and are smaller than the refraction limit of an object lens 7. Specifically, it is equivalent to or less than the resolution of the optical system to be evaluated. Thus, in addition to the function of the above described optical intensity unification unit 3, light whose intensity angle distribution is almost unified in a range wider than the angular aperture of the object lens 7 is emitted from each pin-hole 22. It is preferable for the distribution range of the pin-hole array to be wider than the view field of the microscopic optical system to be evaluated. The lattice arrangement of the pin-hole array is not limited to that shown in FIG. 3 and it can be another arrangement if it is two-dimensionally periodic.

The sample 4 is mounted on a Z-axis stage 5 which moves in the optical axis direction of the microscopic optical system including the object lens 7. The optical axis of the microscopic optical system is assumed to be the Z-axis. The Z-axis stage 5 is a piezo-stage which embeds an electrostatic capacity sensor for monitoring the amount of displacement and can move the sample 4 to an arbitrary Z-axis position by an external control signal. An XY stage 6 is a manual stage which can move the Z-axis stage 5 and the sample 4 in a direction perpendicular to the optical axis of the microscopic optical system.

The microscopic optical system to be evaluated comprises an object lens 7 and an tube lens 9, and forms the image of the sample 4 on the imaging surface of an imaging device 10. The imaging device 10 is a two-dimensional CCD having an imaging area which is larger than the imaging range of the microscopic optical system or can picks up the most of it. These devices 7, 9, 10 are mounted on an observation tube 11. The object lens 7 is mounted on the observation tube 11 via a rotation unit 8. The rotation unit 8 can rotate and fix the object lens 7 at an arbitrary angle using the optical axis as the rotation axis. The observation tube 11 is mounted on an observation base 13 via a longitudinal movement stage 12 for longitudinally moving it.

The light source 1, the Z-axis stage 5 and the imaging device 10 are connected to a computer 14. The computer 14 comprises a CPU, RAM and ROM 16 on which is recorded a control program 15, which is described later, and the like. By executing the control program 15 recorded on the ROM 16, the CPU controls the connected units to pick up the image of the sample 4 and to calculate an aberration evaluation value. The computer 14 further comprises a storage medium 17 on which are recorded image files and the like, an input unit and a display unit.

Next, the operation of the lens evaluation device having such a configuration is described.

An operator mounts an object lens to be evaluated on the rotation unit 8 and mounts a sample 4 with a pin-hole diameter suitable for the object lens 7 on the Z-axis stage 5. Then, while monitoring the image of the imaging device 10 on the screen of the display unit of the computer 14 determines the position of the sample 4 by the XY stage 6 and also focuses the sample 4 by longitudinal movement stage 12 or the Z-axis stage 5. This focusing is not limited to manual and, for example, can also be automatic by providing the lens evaluation device with an automatic focusing unit.

After focusing thus, the CPU of the computer 14 starts executing the imaging program. This imaging program is part of the control program recorded on the ROM 16 of the computer 14 and controls to automatically pick up a stack image by a plurality of wavelengths. The procedure of this imaging program is described below with reference to FIG. 4. The plurality of wavelengths is composed of a reference wavelength which is based on when evaluating chromatic aberration and a plurality of wavelengths to be evaluated.

In FIG. 4, firstly in S1, the Z-axis stage 5 is moved from the focused position (position after the focusing) to the bottom of the imaging range. It is preferable to set the imaging range in the Z direction to approximately several times of focal depth in such a way as to include the respective ranges of the field curvature and chromatic aberration in the longitudinal direction of the object lens to be evaluated.

In S2, by switching the interference filter of the wavelength selection means of the light source 1, the illumination light is switched to one to which S2 and S3, which is described later, are not applied yet in the current Z-axis stage position, of the plurality of wavelengths. Then, the amount of light is switched to an appropriate one by the ND filter (light amount adjustment means) of the light source 1. This amount of light is set in advance in such a way that the respective brightness of the stack image by the plurality of wavelengths is matched to the same level.

In S3, the imaging device 10 picks up the image of the sample 4 and transfers it to the computer 14 as an image file. The transferred image file is recorded on the storage medium 17 of the computer 14.

In S4, it is determined whether S2 and S3 are applied to all the plurality of wavelengths in the current Z-axis stage position (the number reaches the number of the wavelengths). If the determination result is yes, the process proceeds to S5. If the determination result is no, the process returns to S2. As described above, by repeating S2 and S3 until the determination result in S4 becomes yes, the image file of each of the plurality of wavelengths in the current Z-axis stage position is transferred to and recorded on the computer 14.

In S5, it is determined whether the number of image files of all the wavelengths transferred to and recorded on the computer 14 reaches the number of stack images covering the imaging range in the Z direction. If the determination result is yes, the imaging by the imaging program is terminated. If the determination result is no, the process proceeds to S6.

In S6, the Z-axis stage 5 is moved upward by one step. It is preferable for this amount of movement to be approximately ⅕~1/10 of the focal depth of the object lens 7 to be evaluated. After S6, the process returns to S2.

As described above, by repeating S2 through S4 and S6 until the determination result in S5 becomes yes, all the image files of the plurality of wavelengths for the number of stack images covering the sensing range in the Z direction are recorded on the storage medium 17 of the computer 14.

In this procedure, the stack images with the plurality of wavelengths are simultaneously picked up by repeatedly moving the Z-axis stage 5 upward by one step, switching the plurality of wavelengths and sensing each image. Thus, the drift of a sample position within the sensing time, due to the changes of environmental temperature or the like, in each wavelength becomes almost the same. This is effective in reducing an aberration calculation error, which is described later.

Then, the CPU of the computer 14 starts executing an analysis program. The analysis program is part of the control program recorded on the ROM 16 of the computer 14 and controls to automatically calculate the lateral magnification, distortion aberration, field curvature and chromatic aberration of the microscopic optical system including the object lens 7. The procedure of this analysis program is described below with reference to FIG. 5.

In FIG. 5, firstly in S11, the stack image of one to which S11 and S12 and S13, which are described later, are not applied yet, of the plurality of wavelengths is read from the image files recorded on the storage medium 17 of the computer 14 according to the procedure shown in FIG. 4, and is stored in memory (RAM of the computer 14).

In S12, an image position is calculated from one pin-hole image within the sensing range of the one wavelength, to which S12 is not applied yet. The image position means the position of an image point where the intensity of the aerial image of a pin-hole is the maximum. However, since the sampling interval of sensing (the pixel interval of the imaging device 10 and the amount of movement for one step in the Z-axis stage 5) is approximately ⅕~1/10 of the size of a pinhole aerial image, no highly accurate image position can be calculated simply by searching for a pixel position with the maximum brightness. Therefore, in S12, the image position is calculated according to the procedure shown in FIG. 6. The procedure is described in more detail below with reference to FIGS. 6 and 7.

In FIG. 6, firstly in S21, a range where an intensity distribution model is fit to a pin-hole aerial image to be sampled is set. To fit means to apply. The intensity of the pin-hole aerial image gradually decreases as the pin-hole aerial image goes away from the maximum intensity position. In the neighborhood of the maximum intensity, since the change monotonously decreases and is gradual, it is easy to fit a simple intensity distribution model. In this case, the fitting range of the longitudinal direction (Z-axis direction) is made the focal depth of the object lens 7. The fitting range of the lateral direction (XY-axis direction) is made within ½ of the radius of an airy disk. These values can be calculated to be $\lambda/NA^2$ and $0.3\lambda/NA$, respectively, from the (numerical apertures) NA of the object lens 7 to be evaluated and the wavelength $\lambda$ of the illumination light. Firstly, a pixel with the maximum brightness is retrieved from the sampled pin-hole aerial image, and a sampling point included within the (cylindrical) fitting range with the pixel position as the center is made a fitting target, which is described below. The fitting range can also be finely adjusted by increasing/reducing the values.

In S22, the maximum intensity I of one, to which S22 is not applied yet, of the leaf images included in the fitting range of the longitudinal direction and its position $(x_c, y_c)$ are calculated. How to calculate these is described below with reference to FIG. 7. FIG. 7 shows how to calculate the image position of one pin-hole aerial image. In this stack image 26, the cross section 27 of a pin-hole aerial image is sampled as each leaf image 28 for each Z-axis position. The intensity distribution model I(x, y) of the cross section 27 is fit to the sampling point within the fitting range of one leaf image 28 by the least square method. In this preferred embodiment, the rotation-symmetrical two-dimensional Gaussian distribution (equation (1)) is adopted as the intensity distribution model which can be easily fit to intensity distribution in the neighborhood of the maximum intensity position.

$$I(x,y)=I \cdot \exp[-b^2\{(x-x_c)^2+(y-y_c)^2\}] \quad (1)$$

Then, the maximum intensity I of one leaf image 28 and its position $(x_c, y_c)$ are calculated from the fitting intensity distribution model I(x, y). The maximum intensity I and its position $(x_c, y_c)$ which are calculated here is also the maximum value of the fitting intensity distribution model I(x, y) and its plane coordinates, respectively. By such a calculation, the maximum intensity I and its position $(x_c, y_c)$ of one leaf image can be obtained with higher accuracy than the sampling interval in the original XY direction. The sampling interval in the original XY direction means, for example, a sampling interval on the object side, which is determined by the pixel interval of the imaging device 10 and the lateral magnification of an optical system to be evaluated.

Although in S22, an intensity distribution model I (x, y) is fit to the sampling point in the fitting range of one leaf image and the maximum intensity I and its position $(x_c, y_c)$ is calculated, it can also be replaced with that a pixel with the maximum brightness value is retrieved from the sampling points within the fitting range of one leaf image, and the brightness value and its position are calculated. In this case, although in the latter, the accuracy of an image position to be calculated is inferior to the former, an aberration equation where the error of each image position is killed by each other can be determined by the fitting of an aberration model function, which is described later, if there are a sufficient number of pin-holes within the sensing view filed.

In S23, it is determined whether S22 is applied to all the leaf images included in the fitting range of the longitudinal direction (the number of files reaches the number of fit images). If the determination result is yes, the process proceeds to S24. If the determination result is no, the process returns to S22. As described above, by repeating S22 until the determination result in S23 becomes yes, the maximum intensity I of each of the leaf images included in the fitting range of the longitudinal direction and its position $(x_c, y_c)$ can be calculated. In FIG. 7, the position 29 of each leaf image 28 indicates the maximum intensity position $(x_c, y_c)$ of each calculated leaf image. In this case, the maximum intensity position of a pin-hole aerial image lies on a straight line connecting the maximum intensity position 29 of each leaf image 28.

Therefore, in S24, fitting a linear model (equations (2) and (3)) to the maximum intensity position $x_c(z)$, $y_c(z)$ of each leaf image as a Z-coordinate function by the least square method, these straight lines are calculated.

$$x_c(z) = a_x \cdot z + b_x \quad (2)$$

$$y_c(z) = a_y \cdot z + b_y \quad (3)$$

In many cases, since the amount of drift varies in almost proportion to a sensing time, a linear model (primary curve model) is sufficient for a fit model. If the sensing time is long and the amount of drift varies complexly, an n-degree curve model can also be selected.

In S25, an n-degree curve model is fit to the maximum intensity I(z) of each leaf image as a Z-coordinate function by the least square method. Since in case of n=2, the model cannot be fit to the asymmetry of I(z) due to spherical aberration, n=4~6 is preferable.

In S26, the peak position of the n-degree curve model fit to the maximum intensity I(z) of each leaf image as a Z-coordinate function is calculated. This becomes the Z-coordinate of the maximum intensity position of a pin-hole aerial image. Then, the XY-coordinates of the maximum intensity position are calculated by assigning the Z-coordinate to the linear models $x_c(z)$ and $y_c(z)$ calculated in S24. The image position calculated thus is converted into the actual coordinates on the object side or on the image side, as requested. In order to convert it into the actual coordinates on the object side, the sampling interval in the Z direction is converted into the step movement interval (unit: µm) of the Z-axis stage 5. The sampling interval in the XY direction is converted into a value obtained by dividing the pixel interval (unit: µm) of the imaging device 10 by the lateral magnification of an optical system to be evaluated.

It is usually sufficient for this lateral magnification to be a design value of the optical system to be evaluated (how to calculate an accurate lateral magnification is described later in S17). This also applies to the conversion to the actual coordinates on the image side. Then, the calculation of one image position is terminated.

According to the procedure shown in FIG. 6, the XYZ coordinates of one image position can be obtained with higher accuracy than the original sampling interval. Besides the above, there is also a method of directly fitting a three-dimensional intensity distribution model. However, in that case, it is difficult to follow the complex transformation of a pin-hole aerial image, due to drift or the like. The calculation procedure of an image position shown in FIG. 6 has an advantage that such a complex transformation can be absorbed by the combination of fairly simple intensity distribution models.

Back to FIG. 5, in S13, it is determined whether S12 is applied to all the pin-holes within the sensing range of a stack image with one wavelength (the number reaches the number of the pin-holes). If the determination result is yes, the process proceeds to S14. If the determination result is no, the process returns to S12. As described above, by repeating S12 until the determination result in S13 becomes yes, all the image positions can be calculated from all the pin-holes within the sensing range of a stack image with one wavelength.

In S14, it is determined whether S11 through S13 are applied to all the plurality of wavelengths (the number reaches the number of the wavelengths). If the determination result is yes, the process proceeds to S15. If the determination result is no, the process returns to S1. As described above, by repeating S11 through S13 until the determination result in S14 becomes yes, all the image positions within the sensing range of each of the stack images with a plurality of wavelengths can be calculated. In other words, the distribution of image positions of each wavelength can be calculated.

In S15, the respective averages $\bar{a}_x, \bar{a}_y$ of the inclination $a_x$ and $a_y$ of the linear model (equations (2) and (3)) fit in S24 (see FIG. 6) of all the wavelengths is calculated. In this case, an inclination common to all the pin-hole images is the component of drift. The further the image position calculated in S12 goes away from the focus surface (Z=0), the bigger becomes the error of the XY-coordinates of the image position due to drift. Therefore, by subtracting the products $\bar{a}_x z$, $\bar{a}_y z$ of the average inclination of all wavelengths and the Z-coordinate of the image position from the XY-coordinates of each image position of each wavelength, an error due to drift (drift component) is eliminated. Although in the sensing procedure shown in FIG. 4, the stack images with the plurality of wavelengths are simultaneously picked up, this drift component is effectively eliminated.

In S16, an object point position, specifically the position of each pin-hole of the pin-hole array specimen is calculated. This object point position is needed to evaluate especially the lateral magnification and the distortion aberration. If the optical system to be evaluated is of compression type like a camera lens, sufficient measurement accuracy can be obtained by actual measurement since the interval between the object points of the specimen is wide. However, when evaluating an enlargement optical system such as a microscopic optical system, it is difficult to actually calculate the highly accurate XY-coordinates of an object point position. The highly accurate pin-hole interval of a pin-hole array specimen can be obtained by a manufacturing technique such as photolithography or the like. How to calculate an installation position when installing it on the object side of the optical system to be evaluated is described below with reference to FIGS. 2 and 10.

FIG. 10 shows the positional relationship between a pin-hole array specimen 61 (sample 4) arranged in a rectangular lattice at lattice intervals $a_x$ and $a_y$ and coordinates on the object side. The origin of the coordinates is the optical axis of the optical system, and the XY axes are directed to the horizontal and vertical directions of the imaging device 10.

Firstly, the sample 4 is fixed on the Z-axis stage 5. In this case, the angle between the pin-hole array directions and the vertical/horizontal directions of the imaging device 10 is assumed to be $\theta_p$. Then, the index (p, q) of each pin-hole is determined as shown in FIG. 10 with one pin-hole near the coordinate origin as an index (0, 0). The position of a pin-hole with index (0, 0) is assumed to be $(x_p, y_p)$. The object point position (x, y) of the pin-hole with index (p, q) is expressed as follows by angle $\theta_p$ rotation and parallel movement $(x_p, y_p)$.

$$\begin{pmatrix} x(p,q) \\ y(p,q) \end{pmatrix} = \begin{pmatrix} \cos\theta_p & -\sin\theta_p \\ \sin\theta_p & \cos\theta_p \end{pmatrix} \begin{pmatrix} p \cdot a_x \\ q \cdot a_y \end{pmatrix} + \begin{pmatrix} x_p \\ y_p \end{pmatrix} \quad (4)$$

$$= \begin{pmatrix} a_x \cos\theta_p \cdot p - a_y \sin\theta_p \cdot q + x_p \\ a_x \sin\theta_p \cdot p + a_y \cos\theta_p \cdot q + y_p \end{pmatrix}$$

If the error of lattice intervals $a_x$ and $a_y$ can be neglected, the object point position is determined if $\theta_p$ and $(x_p, y_p)$ are determined. The coordinate origin on the image side is defined as a position where the coordinate origin on the object side is formed by the reference wavelength. Furthermore, if the distortion aberration of the microscopic optical system is neglected since it is generally very small, the image position (X, Y) of each pin-hole at the reference wavelength becomes as follows. $\bar{\beta}$ is the average of the lateral magnification in a measurement area.

$$\begin{pmatrix} X(p,q) \\ Y(p,q) \end{pmatrix} = \bar{\beta} \begin{pmatrix} x(p,q) \\ y(p,q) \end{pmatrix} = \bar{\beta} \begin{pmatrix} a_x \cos\theta_p \cdot p - a_y \sin\theta_p \cdot q + x_p \\ a_x \sin\theta_p \cdot p + a_y \cos\theta_p \cdot q + y_p \end{pmatrix} \quad (5)$$

Then, the plane of the following equations (6) where the product $(a_x p, a_y q)$ of an index and an lattice interval is an independent variable is fit to the image position (X, Y) of the reference wavelength calculated in S11 through S14 by the least square method.

$$X(a_x p, a_y q) = A \cdot (a_x p) + B \cdot (a_y q) + C$$

$$Y(a_x p, a_y q) = D \cdot (a_x p) + E \cdot (a_y q) + F \quad (6)$$

Parameters A~F obtained from these equations have the following relationship with equation (5).

$$A = \bar{\beta} \cos\theta_p, \quad B = -\bar{\beta} \sin\theta_p, \quad C = \bar{\beta} x_p$$

$$D = \bar{\beta} \sin\theta_p, \quad E = \bar{\beta} \cos\theta_p, \quad F = \bar{\beta} y_p \quad (7)$$

Thus, $(x_p, y_p)$, $\theta_p$ and $\bar{\beta}$ can be obtained as follows. $\theta_p$ and $\bar{\beta}$ are the averages of values obtained from two planes.

$$x_p = \frac{C}{\sqrt{A^2 + B^2}}, \quad (8)$$

$$y_p = \frac{F}{\sqrt{D^2 + E^2}}$$

$$\theta_p = \arctan\left(-\frac{B}{A}\right) \text{ or } \arctan\left(\frac{D}{E}\right)$$

$$\bar{\beta} = \sqrt{A^2 + B^2} \text{ or } \sqrt{D^2 + E^2}$$

By assigning the $(x_p, y_p)$ and $\theta_p$ calculated thus to equation (4), the coordinates of the object point position of each pin-hole can be obtained. The same result can be obtained even by calculating using index (p, q) as an independent variable.

The object point position of an arbitrary lattice type other than a rectangular lattice can also be determined similarly. If the object point position $(x_0, y_0)$ in the case where $\theta_p$ and $(x_p, y_p)$ both are zero is a pin-hole array specimen expressed as follows, $$\begin{pmatrix} x_0(p,q) \\ y_0(p,q) \end{pmatrix} = pa_1 + qa_2 = p\begin{pmatrix} a_{1x} \\ a_{1y} \end{pmatrix} + q\begin{pmatrix} a_{2x} \\ a_{2y} \end{pmatrix} \quad (9)$$

, where $a_1$ and $a_2$: Primitive translation vectors of a two-dimensional lattice Then, the plane of equation (10) where index (p, q) is an independent variable is fit to each of the image positions (X, Y) of the reference wavelengths by the least square method.

$$X(p, q) = A \cdot p + B \cdot q + C$$

$$Y(p, q) = D \cdot p + E \cdot q + F \quad (10)$$

$(x_p, y_p)$, $\theta_p$ and $\bar{\beta}$ can be obtained as follows, using these parameters A~F.

$$x_p = \frac{C}{\bar{\beta}}, \quad (11)$$

$$y_p = \frac{F}{\bar{\beta}}$$

$$\theta_p = \arctan\left(\frac{Aa_{2x} - Ba_{1x}}{Aa_{2y} - Ba_{1y}}\right) \text{ or } \arctan\left(-\frac{Da_{2y} - Ea_{1y}}{Da_{2x} - Ea_{1x}}\right)$$

$$\bar{\beta} = \frac{\sqrt{(Aa_{2x} - Ba_{1x})^2 + (Aa_{2y} - Ba_{1y})^2}}{a_{1x}a_{2y} - a_{1y}a_{2x}} \text{ or } \frac{\sqrt{(Da_{2x} - Ea_{1x})^2 + (Da_{2y} - Ea_{1y})^2}}{a_{1x}a_{2y} - a_{1y}a_{2x}}$$

Therefore, when the arrangement of a pin-hole array specimen is a two-dimensional periodic lattice, the object point position can be calculated regardless of its lattice type.

In S17, the imaging equation in the lateral direction including the lateral magnification and the distortion aberration coefficient is determined. If the aberration of the optical system to be evaluated is highly corrected, high-degree distortion aberration can be neglected. The amount of movement of an image position, due to the lowest order (third) distortion aberration is in proportion to the cube of the distance from the "center of distortion", and its direction lies on a straight line connecting the center of distortion and the object point position. Therefore, the imaging equation in the lateral direction, specifically the relationship equation between the position r of an object point and that R of an image point can be expressed as follows.

$$R = \beta_0 r + R_s - A_3 |r - r_c|^2 (r - r_c), \quad (12)$$

where $R = \begin{pmatrix} X \\ Y \end{pmatrix}$: Position of an image point, $r = \begin{pmatrix} x \\ y \end{pmatrix}$: Position of an object point, $R_s = \begin{pmatrix} X_s \\ Y_s \end{pmatrix}$: Amount of shift, $r_c = \begin{pmatrix} x_c \\ y_c \end{pmatrix}$: Center of distortion, $\beta_0$: Lateral magnification at the "center of distortion" and $A_3$: coefficient of third-order distortion Then, the $\beta_0$, $R_s$, $A_3$ and $r_C$ of equation (12) are calculated as follows, using the image position (X, Y) calculated in S11 through S15 and the object point position (x, y) actually measured or calculated in S16.

The image position calculated by assigning the object point position $r_i$ of the i-th pin-hole of N measured pin-holes to the imaging equation (12) is assumed to be $R'_i$. The image position obtained by measuring the i-th pin-hole is assumed to be $R_i$. When the square sum of the respective distance between all corresponding $R'_i$s and $R_i$s becomes the minimum, the imaging equation (12) is fit to its actual image position. Therefore, the parameters $\beta_0$, $R_s$, $A_3$ and $r_C$ are optimized in such a way that the evaluation function S of the following equation (13) can be minimized.

$$S = \frac{1}{N} \sum_i |R_i - R'_i|^2 = \frac{1}{N} \sum_i |R_i - \beta_0 r_i - R_s + A_3 |r_i - r_c|^2 (r_i - r_c)|^2 \quad (13)$$

The optimization is performed by a general iterative optimization algorithm for a non-linear model, such as the "steepest descent method" or the like (see W. H. Press et al., "Numerical Recipe in C: the Art of Scientific Computing 2nd Ed.", Cambridge University Press (1922)). The measurement value of an image position (X, Y) corresponding an arbitrary object point position (x, y) can be obtained from the imaging equation in the lateral direction, calculated thus.

If the object point position cannot be calculated as in S16 since the distortion aberration of the optical system to be evaluated is large, equation (4) is assigned to equation (13). Then, $\theta_p$ and $(x_p, y_p)$ as well as parameters $\beta_0$, $R_s$, $A_3$ and $r_C$ can be calculated by the above-described iterative optimization.

If it is known in advance that the amount of shift $R_s$ and the center of distortion $r_C$ are negligibly small, $\beta_0$ and $A_3$ can also be calculated as follows. In this case, the imaging equation in the lateral direction (equation (12)) is transformed as follows.

$$\frac{|R|}{|r|} = \beta_0 - A_3 |r|^2 \quad (14)$$

By fitting a quadratic surface (right term) to the ratio of height between an object point and an image point (left term) by the least square method, $\beta_0$ and $A_3$ can be obtained.

Furthermore, if it is known in advance that the distortion aberration is negligibly small, the approximate imaging equation parameters $\overline{\beta}$ and $\overline{R}_s$ of equation (15) can be calculated.

$$R = \overline{\beta} r + \overline{R}_s \quad (15)$$

By fitting the straight line of the following equations (16) to each of the set of the x-coordinates $(x_i, X_i)$ and y-coordinates $(y_i, Y_i)$ of the corresponding object point and image point by the least square method $$X = Ax + B, \quad Y = Cy + D \quad (16)$$

the following parameters can be obtained.

$$A = \overline{\beta}, \quad B = \overline{X}_s, \quad C = \overline{\beta}, \quad D = \overline{Y}_s \quad (17)$$

In this case, the lateral magnification $\overline{\beta}$ is the average of A and C.

As described above, after selecting in advance the form of the imaging equation in the lateral direction in accordance with the optic system to be evaluated, in S17 the parameters are calculated. If higher order distortion aberration must also be evaluated, terms relating to $|r|^4$, $|r|^6$, ... can be added to equation (12) or (14).

If the field curvature and chromatic aberration in the longitudinal direction of the optical system to be evaluated is sufficiently small, or if the focal depth is sufficiently large, it is clear that the imaging equation in the lateral direction can be determined from one image picked up in the focused state. When evaluating only such an imaging equation, the S1 of the flowchart (FIG. 4) of sensing a stack image can be modified to "Move Z stage to the focal position" and S5 and S6 can be omitted. And S23 through S25 of the flowchart of calculating the image position can be omitted.

In S18, the imaging equation in the longitudinal direction, specifically the relationship equation between the object point position r and the Z-coordinate of an image point is determined. If the aberration of the optical system to be evaluated is highly corrected, the image surface can be expressed by a quadratic surface as follows.

$$Z = c|r - r_0|^2 + Z_0, \quad (18)$$

where $r = \begin{pmatrix} x \\ y \end{pmatrix}$: Position of an object point $r_0 = \begin{pmatrix} x_0 \\ y_0 \end{pmatrix}$: Center of field curvature, and $Z_0$: Z-coordinate of the peak of field curvature Then, in S18, the imaging equation in the longitudinal direction (equation (18)) is determined by fitting a quadratic surface model to the Z-coordinate of the image position calculated in S11 through S15, corresponding to the object point position r calculated in S16. A coefficient c is a quadratic coefficient expressing an field curvature, and $x_0$, $y_0$ and $Z_0$ are the coordinates of the peak of the quadratic surface. Thus, the measurement value of the Z coordinate of an image position corresponding to an arbitrary object point position (x, y) can be obtained from the calculated imaging equation in the longitudinal direction. Depending on the optical system to be evaluated, sometimes it is suitable to set an field curvature model including higher order items. In that case, terms relating to $|r|^4, |r|^6, \ldots$ can be added to equation (18).

In S19, the operation of subtracting the XYZ coordinates of an image position of the reference wavelength, calculated in S11 through S15 from the XYZ coordinates of an image position of one evaluation wavelength, calculated in S11 through S15, respectively, is applied to all the image positions and the differential distribution $\Delta X(x, y)$, $\Delta Y(x, y)$ and $\Delta Z(x, y)$ of an image position as the function of a object point position (x, y) is calculated.

$\Delta X(x, y)$ and $\Delta Y(x, y)$ are chromatic aberration distribution in the lateral direction. If the aberration of the optical system to be evaluated is highly corrected and it is sufficient to take into consideration only a small lateral magnification difference due to a wavelength, specifically the chromatic aberration of magnification, the distribution of the XY coordinates of an image position is shown in FIG. 8. As shown in FIG. 8, the image position 32 of an evaluation wavelength (white circle in FIG. 8) slightly deviates sideway against the image position of the reference wavelength 31 (black circle) by the difference of the lateral magnification. In this case, the positional relationship between both has the following nature.

The image position 32 deviates sideway from the position with no deviation, specifically the center $(x_c, y_c)$ 33 of lateral chromatic aberration.

The amount of lateral side deviation $\Delta R$ 34 is in proportion to the distance from the center 33 of the lateral chromatic aberration.

The size of the X-coordinate component $\Delta X$ 35 of the side deviation depends on only the x-coordinate of the object point position. Similarly, the size of the Y-coordinate component $\Delta Y$ 36 depends on only the y-coordinate of the object point position.

As a result, $\Delta X$ and $\Delta Y$ can be expressed by the following linear equations (19) and (20). The coefficient A is a "magnification chromatic aberration coefficient".

$$\Delta X(x,y) = A \cdot (x - x_c) \quad (19)$$

$$\Delta Y(x,y) = A \cdot (y - y_c) \quad (20)$$

The lateral chromatic aberration expressions (equations (19) and (20)) are determined by fitting the linear model of equations (19) and (20) to all the image position differences $\Delta X$ and $\Delta Y$ by the least square method. The measurement value of the lateral chromatic aberration corresponding to an arbitrary object point position (x, y) can be obtained from the calculated lateral chromatic aberration expression.

However, the $\Delta Z(x, y)$ is the chromatic aberration distribution in the longitudinal direction. When an image surface is expressed by a quadratic surface, the longitudinal chromatic aberration becomes the quadratic surface like equation (18). Therefore, the longitudinal chromatic aberration expression is determined by fitting a quadratic surface model to all the image position difference $\Delta Z(x, y)$ by the least square method. Thus, the measurement value of the longitudinal chromatic aberration corresponding to an arbitrary object point position (x, y) can be obtained from the calculated longitudinal chromatic aberration expression. If it is suitable to set an field curvature model including higher order terms in the optical system, the model function of the longitudinal chromatic aberration should also be modified so.

The respective chromatic aberration in the lateral and longitudinal directions can also be calculated according to the imaging equations calculated in S17 and S18. Specifically, the image positions (X, Y) of an evaluation wavelength and the reference wavelength, corresponding to an arbitrary object point position (x, y) are obtained from the imaging equation in the lateral direction. In this case, the measurement value of the lateral chromatic aberration corresponding to the object point position (x, y) can be obtained as the difference between both. The chromatic aberration in the longitudinal direction can be obtained similarly.

In S20, it is determined whether S17 through S19 are applied to all the plurality of wavelengths (the number reaches the number of the wavelengths). If the determination result is yes, the calculation of the evaluation value by the analysis program is terminated. If the determination result is no, the process returns to S17. As described above, by repeating S17 through S19 until the determination result in S20 becomes yes, the imaging equations in the lateral and longitudinal directions and the chromatic aberration expression (only the evaluation wavelength) of the plurality of wavelengths can be determined. Specifically, the respective measurement values of the lateral magnification, distortion aberration, field curvature and lateral/longitudinal chromatic aberration can be obtained.

Each image position has measurement errors, such as an error due to the uneven surface of the sample 4, the error in the amount of movement of the Z-axis stage 5, the error of image position calculation and the like. However, by fitting an aberration model function to them as described above, the measurement errors of each image position are killed by each other, thereby determining highly accurate aberration expressions.

If the error of the lateral magnification and the distortion aberration both are small and only the field curvature and chromatic aberration are evaluated, S16 for calculating an object point position can be simplified. Specifically, an object point position can be calculated by dividing the image position of the reference wavelength calculated in S11 through S15 by the lateral magnification in the design of the optical system. In this case, there is always no need to arrange the pin-hole arrays of the sample 4 regularly. However, if the fitting of an aberration is taken into consideration, it is preferable to almost uniformly distribute pin-holes in the sensing view field.

In S12 for calculating an image position, a highly accurate image position is calculated by repeating the fitting of a model function (see FIG. 6). However, simply the pixel position with the maximum brightness in all the stack images of each pin-hole can also be retrieved and be specified as the image position. In this case, the accuracy of a calculated aberration expression decreases compared with the procedure shown in FIG. 6. However, if the number of pin-holes in the sensing view field is sufficiently large, a fairly accurate aberration expression can be determined since the error of each image position is killed by each other by fitting an aberration model function. Alternatively, the center of gravity position of intensity can be calculated instead of the maximum intensity position of the leaf image or all the stack image of a pin-hole. However, generally since an image position is defined as the maximum intensity position, the maximum intensity position is more preferable.

In the procedure shown in FIG. 5, in S15 a drift component is eliminated. However, if the drift component can be neglected, S15 can also be omitted and after S14 becomes yes, the process can also proceed to S16.

In S17 and S18, an imaging equation including the distortion aberration or field curvature that is rotation symmetric around the center of aberration is adopted. However, depending on the optical system to be evaluated, another form of an imaging equation including a rotation-asymmetric aberration can also be adopted.

In the case of the microscopic optical system, most of aberration is due to the object lens 7. Therefore, it is effective to add the following procedure for evaluating the aberration of the object lens 7 alone.

When the object lens 7 is rotated by the rotation unit 8, a component due to the object lens 7, of the parameters of the XY coordinates (the center of the lateral chromatic aberration, etc.) included in the imaging equation in the lateral/longitudinal directions and the chromatic aberration expression also rotates and moves accordingly. The operation is described below with reference to FIG. 9. As shown in FIG. 9, the movement of the XY coordinates accompanying the rotation draws the locus of a circle 41. In this case, the center 42 of the circle 41 does not always coincide with the center 43 of the view field. The difference 44 between both is a component due to the errors in the disposition of the optical system other than the object lens 7 and devices. The radius of the circle 45 is a component due to the object lens 7.

Then, the rotation unit 8 is rotated by 180 degrees and the same measurement is performed. The average of the parameters of the XY coordinates of both is a component due to other than the object lens 7. ½ of the difference between both is a component due to the object lens 7. Furthermore, if the rotation angle is divided, the measurement is performed, for example, in four positions of 0, 90, 180 and 270 degrees and the center 42 and radius 45 of the circle 41 is calculated, both components can be separated with further higher accuracy. The parameters of the Z coordinate (Z coordinate of the peak of the field curvature, etc.) and parameters other than the coordinate (lateral magnification, each aberration coefficient, etc.), included in the imaging equation in the lateral/longitudinal directions and the chromatic aberration expression never change accompanying the rotation. The measurement errors of these values can be improved by averaging the plurality of measurement values.

Although in this preferred embodiment, the sample 4 is moved in the optical axis direction by the Z-axis stage 5, the imaging device 10 can also be moved and a stack image can also be picked up. Specifically, at least one movement means for relatively changing the distance between the optical system to be evaluated and either the sample 4 or the imaging device 10 is necessary. As clear from the algorithm, there is no need for each step of the movement means to be equal as long as the amount of step movement of the movement means is recorded as a numeric value.

Although the sample 4 is trans-illuminated by the light source 1, the light source can be replaced with another preferred form as long as a plurality of point light sources is arranged on the plane. For example, it can be replaced with the output terminal array of optical fibers, a illuminants like fluorescent beads, etc. which are arranged on the plane. If the pin-hole array specimen as shown in FIG. 3 is assumed to "negative", its "positive" specimen can also be used. Specifically, a specimen in which only the parts of the metal film 21 corresponding to the pin-holes 22 shown in FIG. 3 are left and the other parts of metal film 21 are eliminated can be used. This is because the reflection light from each metal film 21 can be regarded to be a plurality of point light sources when such a specimen is illuminated from top. When evaluating by only one wavelength, a illuminant with a single wavelength, such as a light-emitting diode array can also be used. It is preferable for the size of this point light source to be equal to or less than the resolution of the optical system to be evaluated. The measurement accuracy can be further improved by increasing the number of point light sources in the sensing view field. Furthermore, the measurement accuracy can be further improved by using an imaging device 10 whose pixel density per sensing area is high, specifically an imaging device with high pixel density.

Next, the second preferred embodiment of the present invention is described with reference to FIGS. 11-14.

Figure 11:
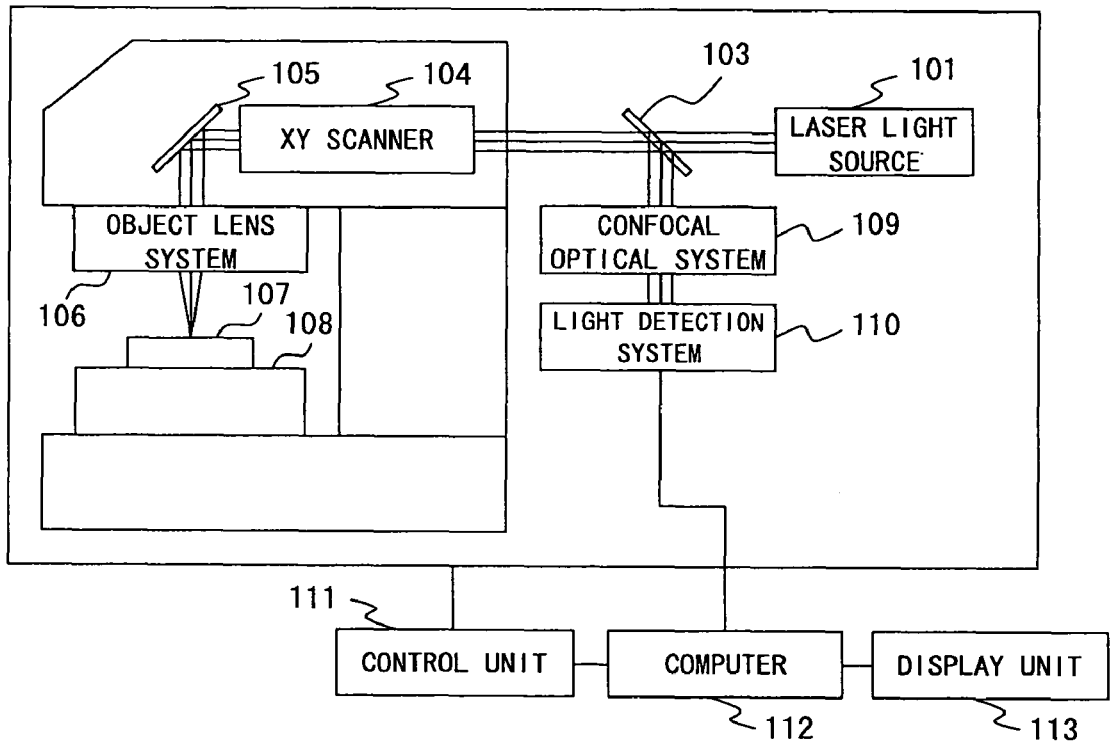
FIG. 11 shows the side view of the fluorescent confocal microscope of the lens evaluation device in the second preferred embodiment and the block diagram of its control system.

FIG. 11 shows the side view of the fluorescent confocal microscope of the lens evaluation device in the second preferred embodiment and the block diagram of its control system.

A plurality of pieces of illumination light (excitation light) from a laser light source 101 for emitting laser beams with a plurality of wavelength is collected to the focal position of a sample 107 by an object lens system 106 via an XY scanner 104 and a total reflector 105. Reflection light (fluorescent) from the sample 107 is branched and reflected by a dichroic mirror 103 provided between the XY scanner 104 and the laser light source 101 via the object lens system 106 and the total reflector 105 and is received by a light detection system 110 via a confocal optical system 109. In this case, only reflection light from the focal position is inputted to the light detection system 110, by the confocal effect of the confocal optical system 109. The inputted light is converted into electric signals by the light detection system 110 and is transmitted to a computer 112 as brightness information.

The XY scanner 104 comprises an X galvano-mirror for swinging the luminous flux of the illumination light from the laser light source 101 to the X direction and a Y galvano-mirror for swinging the luminous flux to the Y direction perpendicular to the X direction, which can scan the light condensation position in the sample in the X and Y directions that are perpendicular to each other against the optical axis.

The Z stage 108 can move the mounted sample 107 in the optical axis direction while maintaining it, by which it can move the focal position of the sample 107 to the Z direction, which is the optical axis direction.

A computer 112 builds up the scan image of the sample 107 from the brightness information outputted from the light detection system 110 according to the scanning through the sample 107 of the illumination light by the XY scanner 104. The built scan image can be viewed by displaying it on a display unit 113.

A control unit 111 controls the wavelength switching of the laser light source 101 and the operation of the XY scanner 104 and the Z stage 108 based on instructions of the computer 112.

Next, the operation of sensing a stack image in order to calculate aberration measurement values in the confocal microscope with the above-described configuration is described. A specimen in which only the parts of the metal film 21 corresponding to the pin-holes shown in FIG. 3 are left and the other parts of the metal film 21 are eliminated is set.

The operator focuses a stack image by the Z stage 108 while displaying the image obtained by the scan of the XY scanner 104 on a display unit 113. Then, the CPU of the computer 112 starts executing a sensing program. The sensing program is part of a control program recorded on the computer 112 and automatically controls to pick up the stack image with a plurality of wavelengths. The procedure by this sensing program is described below with reference to FIG. 4. The plurality of wavelengths is emitted by the laser light source 101 for emitting laser beams with a plurality of wavelengths.

In FIG. 4, firstly in S1, the Z stage 108 is moved from the focused position (position after the focusing) to the bottom of the sensing range. It is preferable to set the sensing range in the Z direction to approximately several times of focal depth in such a way as to include the field curvature and the chromatic aberration range in the longitudinal direction of the object lens system 106.

In S2, the wavelength of the laser light source 101 is switched to one to which S2 and S3 are not applied yet in the current Z-axis stage position, of the plurality of wavelengths.

In S3, the image of the sample 107 is picked up by the scanning of the XY scanner 104 and is recorded on the storage medium of the computer 112.

In S4, it is determined whether S2 and S3 are applied to all the plurality of wavelengths in the current Z stage position (the number reaches the number of the wavelengths). If the determination result is yes, the process proceeds to S5. If the determination result is no, the process returns to S2. As described above, by repeating S2 and S3 until the determination result in S4 becomes yes, the image files of each of the plurality of wavelengths in the current Z stage 108 position are recorded on the computer 112.

In S5, it is determined whether the number of the image files of each wavelength transferred to and recorded on the computer 112 reaches the number of stack images covering the sensing range in the Z direction. If the determination result is yes, the sensing by the sensing program is terminated. If the determination result is no, the process proceeds to S6.

In S6, the Z stage 108 is moved upward by one step. It is preferable for this amount of movement to be approximately ⅕~1/10 of the focal depth of the object lens system 106 to be evaluated. After S6, the process returns to S2.

As described above, by repeating S2 through S4 and S6 until the determination result in S5 becomes yes, the image files of each wavelength for the number of stack images covering the sensing rang in the Z direction are recorded on the computer 112.

Since the procedure of calculating the evaluation values of the lateral magnification, distortion aberration, field curvature and chromatic aberration of the confocal microscope from the stack image picked up as described above is the same as that of the first preferred embodiment, it is omitted here.

Then, a general sample whose image is corrected is picked up. The procedure of sensing using a plurality of wavelengths is the same as that shown in FIG. 4. The sensing range in the Z direction is set according to the distance in the depth direction of the sample. The stack image of a general sample, picked up thus is hereinafter called an "original image".

Figure 12:
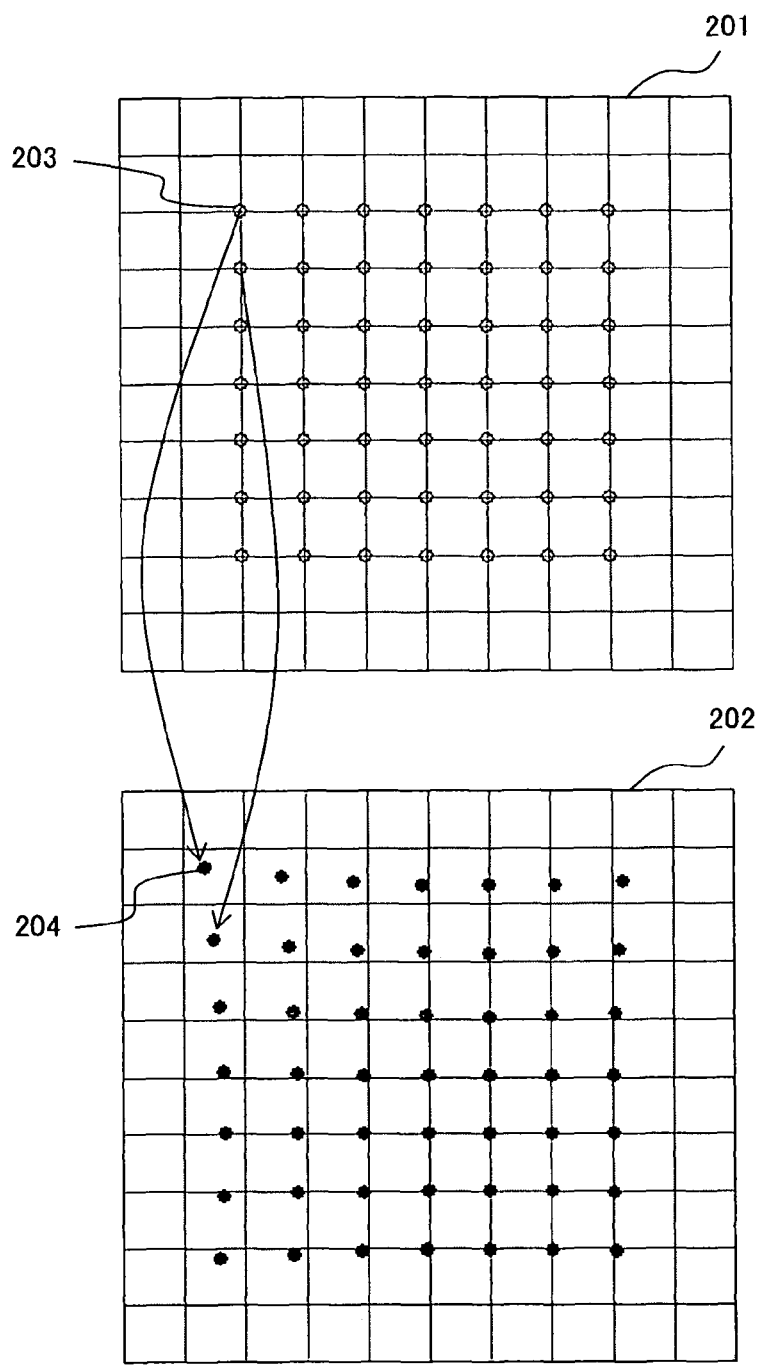
FIG. 12 shows the correspondence in the X and Y coordinates between the object side and the image side.

Next, the procedure of correcting the distortion and color deviation of the original image by the above-described aberration measurement values is described. As one example, the procedure of correcting the lateral magnification, distortion aberration and lateral chromatic aberration of each image in the XY direction of the stack image of the original image (hereinafter called a "leaf image") is described here with reference to FIGS. 12-14. FIG. 12 shows the correspondence in the XY coordinates between the object side and the image side. FIG. 13 shows an interpolation method used to correct an image. FIG. 14 is a flowchart showing the correction of an image.

In FIG. 14, firstly in S31, the XY coordinates of each pixel (hereinafter called an "object point") of an image after correction (hereinafter called a "corrected image") are determined. Generally, the pixel interval of the corrected image is equal to a value obtained by converting the sampling interval of the original image into that on the object (sample) side. However, depending on its usage, it can be larger or smaller than it. The coordinate value 203 of each pixel (object point) of the corrected image 201 is arranged in a lattice as shown in FIG. 12.

In S32, the coordinates of an image point corresponding to the first object point of the corrected image is determined. The coordinates can be obtained by assigning the coordinates of the object point to the imaging equation in the lateral direction (equation (12)), which is already calculated by an aberration evaluation means, of the first wavelength by which the original image has been picked up. As shown in FIG. 12, the coordinate value 203 of the object point of the corrected image 201 is converted into the coordinate value 204 of the image point of the original image 202.

In S33, four pixels of the original image which most closely encircle the coordinate value 204 of the image point are calculated in the first leaf image. The positional relationship between those interpolation source pixels 302-305 and the coordinate value of the image point is shown in FIG. 13.

In S34, the brightness value I at the coordinate value 301 of the image point is calculated by linearly interpolating the brightness values, $I_{i,j}$~$I_{i+1,j+1}$ of the interpolation source pixels 302-305. This linear interpolation is expressed as follows.

$$I = \frac{dx-px}{dx} \cdot \frac{dy-py}{dy} \cdot I_{i,j} + \frac{px}{dx} \cdot \frac{dy-py}{dy} \cdot I_{i+1,j} + \frac{dx-px}{dx} \cdot \frac{py}{dy} \cdot I_{i,j+1} + \frac{px}{dx} \cdot \frac{py}{dy} \cdot I_{i+1,j+1} \quad (21)$$

In the above equation, i and j, dx and dy and px and py are the pixel numbers in the XY directions of the original image, the sampling intervals in the XY directions of the original image and the differences in the XY coordinates between the first interpolation source pixel 302 and the image point 301, respectively. This interpolation brightness value is stored as the brightness value of the object point of the corrected image.

In S35, it is determined whether S32-S34 are applied to all the plurality of object points in the corrected image of the current leaf image. If the determination result is yes, the process proceeds to S36. If the determination result is no, the process returns to S32. As described above, by repeating S32-S34 until the determination result in S35 becomes yes, the corrected image of the current leaf image is completed.

In S36, it is determined whether S32-S35 are applied to all the leaf images of the stack image of the current wavelength. If the determination result is yes, the process proceeds to S37. If the determination result is no, the process returns to S32. As described above, by repeating S32-S35 until the determination result in S36 becomes yes, the corrected image of the stack image of the current wavelength is completed.

In S37, it is determined whether S32-S36 are applied to all the plurality of wavelengths. If the determination result is yes, the image correction is terminated. If the determination result is no, the process returns to S32. As described above, by repeating S32-S36 until the determination result in S37 becomes yes, the corrected images of the stack image of all the wavelengths are completed.

According to this preferred embodiment, a corrected image from which the chromatic aberration of magnification (difference in the lateral magnification by wavelength) and deviation due to the lateral chromatic aberration are eliminated can be obtained. Thus, images measured by a plurality of wavelengths can be overlapped and painted without positional deviations. A corrected image from which lateral magnification errors and distortion aberration are eliminated and corresponds to the accurate XY coordinates of an object can also be obtained. Thus, accurate distance information and the like can be obtained from a corrected image.

According to this preferred embodiment, the comprehensive influence on the image distortion covering all optical devices from the laser light source 101 up to the light detection system 110 can be evaluated and corrected.

Although in this preferred embodiment, a method for correcting the XY coordinates of an original image is described, that in the Z direction can also be corrected in the same procedure. If only that in the Z direction is corrected, the brightness of a corrected image can be calculated by calculating the Z coordinate of an image point corresponding to an object point according to the imaging equation in the longitudinal direction (equation (18)) and linearly interpolating the brightness value of two pixels of the original image, which encircle the image point in the Z direction. Thus, a corrected image from which field curvature and longitudinal chromatic aberration are eliminated can be obtained. Therefore, images measured by a plurality of wavelengths can be overlapped and painted without positional deviations in the depth direction.

Those of the XYZ directions can also be corrected simultaneously in the same procedure. In this case, the XYZ coordinates of an image point corresponding to an object can be calculated according to the imaging equations in the longitudinal/lateral directions. Then, the brightness value of a corrected image can be calculated by linearly interpolating eight pixels of an original image, which encircle the image point most closely. Equation (21) can be easily extended to three-dimensional linear interpolation.

In this preferred embodiment, a confocal microscope for scanning through a sample by one light condensation point is described. However, the present invention is also applicable to a confocal microscope for scanning through a sample by a plurality of light condensation points using a Nipknow's disk or the like.

Excitation light and fluorescent light are somewhat different in the fluorescent confocal microscope. In the preferred embodiment, evaluation is performed by only excitation light wavelengths. However, when a plurality of fluorescent bead samples arranged on the plane is adopted as the sample 107 of a point light source array, more accurate evaluation including a wavelength difference between excitation light and fluorescent light is possible.

Alternatively, a point light source array can be formed by the trans-illumination and a pin-hole array specimen as in the first preferred. In this case, since an arbitrary evaluation wavelength can be specified different from a laser light source, aberration can be evaluated by a fluorescent light wavelength or a wavelength between excitation light and fluorescent light, and an image can also be corrected by it.

In this preferred embodiment, the linear interpolation of the most close pixel is adopted as an interpolation method used to calculate a corrected image from the original image of a sample. However, the interpolation method is not limited to this. The brightness value of a corrected image can also be calculated by a method using far more pixels of the original image or using another interpolation equation.

In this preferred embodiment, a corrected image is calculated for a part of an original image or the entire original image. However, a corrected image is not always necessary for usages, such as image measurement or the like. For example, when a distance between two points on the original image is calculated, the distance can be calculated after getting the coordinates of the object points corresponding to the two image points using the imaging equations in the longitudinal/lateral directions.

The image of a wide-field microscope instead of the confocal microscope can also be corrected by the aberration evaluation values of the present invention. For example, when sensing a three-color image of red, green and blue (RGB) by white color illumination, aberration evaluation values can be measured by representative wavelength of the three-color or a wavelength band via each of three-color filters. The color deviation, distortion and the like can be eliminated by correcting each color image by the evaluation value and then re-combining them.

Although so far the lens evaluation devices in the first and second preferred embodiments have been described, the lens evaluation device in each preferred embodiment can also be applied to optical systems or optical devices other than a microscope. However, in that case, depending on the size of the view field and resolution of an optical system to be evaluated, appropriate point light sources must be prepared. This also applies to the amount of step movement and movement range of a movement means for sensing a stack image. The requirements necessary in that case is already clear from the above description. For the algorithm for determining the imaging equations in the lateral/longitudinal directions and chromatic aberration expressions on basis of a stack image, the same one as in the preferred embodiment of the microscopic optical system can be used. The image correction based on it can also be used.

Although so far the present invention has been described in detail, the present invention is not limited to the above-described preferred embodiments. As long as the subject matter of the present invention is not deviated, any kind of its improvement and modification are possible.

As described above, according to the present invention, the lateral magnification, distortion aberration, field curvature and chromatic aberration of an optical system can be evaluated with high accuracy by collectively sensing the stack images of a plurality of point light sources distributed in the view field by a two-dimensional imaging device and also using an algorithm for applying the fitting of appropriate model functions to the calculation of an image position and aberration. In this case, since the XY coordinates of an image position can be calculated with accuracy lower than the pixel interval of the imaging device, no highly accurate length meter is need to measure them. Since a view field is collectively picked up, a measurement time is widely shortened. This is effective in the reduction of the number of measurement errors due to drift in addition to that stack images by a plurality of wavelengths can be simultaneously picked up. By mounting this evaluation means on an optical device, the distortion or color deviation of an image picked up by the optical device can also be corrected.

What is claimed is:

1. A lens evaluation device, comprising:
   a plurality of point light sources arranged on the plane;
   an imaging unit for picking up an object and obtaining its image;
   a movement unit for changing a relative distance between the point light source or the imaging unit and an optical system to be evaluated;
   a storage medium on which is recorded a stack image obtained by the imaging unit picking up images of the plurality of point light sources via the optical system every time the movement unit changes the relative distance;
   an image position calculation unit for calculating a plurality of image positions from the plurality of point light source images in the stack image recorded on the storage medium; and an aberration acquisition unit for fitting an aberration model function to the plurality of image positions calculated by the image position calculation unit and obtaining the measurement value of the aberration.

2. The lens evaluation device according to claim 1, wherein
the plurality of point light sources is configured in such a way as to select/switch a wavelength of outputted light.

3. The lens evaluation device according to claim 1, wherein the plurality of point light sources comprises
a pin-hole with a diameter equal to or less than resolution of an optical system to be evaluated; and
an illumination unit for trans-illuminating the pin-hole.

4. The lens evaluation device according to claim 1, wherein the plurality of point light sources comprises
a reflector with a diameter equal to or less than resolution of an optical system to be evaluated; and
an illumination unit for illuminating the reflector from top.

5. The lens evaluation device according to claim 1, wherein the plurality of point light sources is arranged in a two-dimensional periodic lattice on the plane.

6. The lens evaluation device according to claim 1, wherein
the imaging unit is composed of two-dimensional imaging devices.

7. The lens evaluation device according to claim 1, wherein the optical system to be evaluated and the imaging unit for picking up an object and obtaining its image are confocal optical devices for scanning one or more light condensation points.

8. The lens evaluation device according to claim 1, wherein the image position calculation unit comprises
a setting unit for setting a model function fitting range in order to calculate an image position from one point light source image in the stack image;
a first fitting unit for fitting a two-dimensional intensity distribution model function to each leaf image of the stack image within the model function fitting range set by the setting unit;
a calculation unit for calculating the maximum value and its coordinates on the plane of the two-dimensional intensity distribution model function fit to each of the leaf images by the first fitting unit;
a second fitting unit for fitting a first curve model function to the coordinates on the plane of each of the leaf images, calculated by the calculation unit;
a third fitting unit for fitting a second curve model function to the maximum value of each of the leaf images, calculated by the calculation unit;
a coordinate operation unit for calculating coordinates of the maximum value of the second curve model function fit by the third fitting unit; and
a function value acquisition unit for obtaining a function value by assigning the coordinates of the maximum value calculated by the coordinate operation unit to the first curve model function fit by the second fitting unit.

9. The lens evaluation device according to claim 1, wherein
the two-dimensional intensity distribution model function is a two-dimensional Gaussian distribution function.

10. The lens evaluation device according to claim 1, wherein
the image position calculation unit comprises
a setting unit for setting a model function fitting range in order to calculate an image position from one point light source image in the stack image;
a first operation unit for calculating the maximum intensity value of each of the leaf images and its coordinates on the plane from each leaf image of the stack image within the model function fitting range set by the setting unit;
a first fitting unit for fitting a first curve model function to the coordinates on the plane of each of the leaf images calculated by the first operation unit;
a second fitting unit for fitting a second curve model function to the maximum value of each of the leaf images calculated by the first operation unit;
a second operation unit for calculating the coordinates of the maximum value of the second curve model function fit by the second fitting unit; and
a function value acquisition unit for obtaining a function value by assigning the coordinates of the maximum value calculated by the second operation unit to the first curve model function fit by the first fitting unit.

11. The lens evaluation device according to claim 8, further comprising
an image position modification unit for modifying the plurality of image positions calculated by the image position calculation unit using an average of the first curve model functions fit to the coordinates on the plane, of each of the leaf images,
wherein
the aberration acquisition unit obtains an aberration measurement value by fitting the aberration model function to the plurality of image positions modified by the image position modification unit instead of the plurality of image positions calculated by the image position calculation unit.

12. The lens evaluation device according to claim 1, wherein
the image position calculation unit comprises
a coordinate operation unit for calculating coordinates of a data point with the maximum intensity from one point light source image in the stack image.

13. The lens evaluation device according to claim 1, wherein
the image position calculation unit comprises
a coordinate operation unit for calculating coordinates of center of gravity of intensity from one point light source image in the stack image.

14. The lens evaluation device according to claim 1, wherein
the positional coordinates of the plurality of point light sources arranged on the plane are measured in advance.

15. The lens evaluation device according to claim 5, further comprising
a point light source position acquisition unit for obtaining the rotation angle at an installation position and amount of parallel movement of a point light source by fitting a plane model function specified by independent variables including indexes p and q of a lattice point to the plurality of image positions calculated by the image position calculation unit, on basis of the plurality of point light source images arranged in the two-dimensional.

16. The lens evaluation device according to claim 15, further comprising
a point light source position calculation unit for calculating positional coordinates of each of the plurality of point light sources arranged in the two-dimensional periodic lattice from the rotation angle at the installation position and the amount of parallel movement of the point light source.

17. The lens evaluation device according to claim 14, wherein
the aberration acquisition unit obtains a measurement value by fitting an imaging model function in the lateral direction including lateral magnification to the position of the plurality of point light sources and the plurality of image positions calculated from the plurality of point light source images.

18. The lens evaluation device according to claim 14, wherein
the aberration acquisition unit obtains a measurement value by fitting an imaging model function in the lateral direction including lateral magnification and a distortion aberration coefficient to the position of the plurality of point light sources and the plurality of image positions in the lateral direction calculated from the plurality of point light source images.

19. The lens evaluation device according to claim 17, wherein
the image position calculation unit calculates a plurality of image positions in the lateral direction from one piece of point light source image picked up by the imaging unit in a focused state of the plurality of point light sources.

20. The lens evaluation device according to claim 1, wherein
the aberration acquisition unit obtains a measurement value by fitting an imaging model function in the longitudinal direction including an field curvature coefficient to the plurality of point light source positions and the plurality of image positions in the longitudinal direction calculated from the plurality of point light source images.

21. The lens evaluation device according to claim 2, wherein
in accordance with the change in the distance by the movement unit, a plurality of stack images obtained per each wavelength by switching the wavelength of the light source is recorded on the storage medium.

22. The lens evaluation device according to claim 21, further comprising;
a difference operation unit for calculating a difference between the plurality of image positions by the first wavelength and the plurality of image positions by the second wavelength which the image position calculation unit calculates from the stack image by the first wavelength and the stack image by the second wavelength, respectively, which are recorded on the storage medium; and
a chromatic aberration acquisition unit for obtaining a chromatic aberration measurement value by fitting a chromatic aberration model function to a plurality of differences calculated by the difference operation unit.

23. The lens evaluation device according to claim 1, further comprising;
a rotation unit for rotating a part of the optical system to be evaluated around the optical axis of the one part; and
a measurement value component separation unit for separating measurement values of the one part of the optical system and measurement values of the part other than the one part, on the basis of the aberration measurement values obtained in the plurality of rotation positions of the one part of the optical system by the rotation unit.

24. The lens evaluation device according to claim 1, wherein
the optical system to be evaluated has a microscopic optical system.

25. The lens evaluation device according to claim 23, wherein
the one part of the optical system is an object lens of the microscopic optical system.

26. An optical device for picking up images of objects, which mounts the lens evaluation device according to claim 1, comprising
an image correction unit for correcting distortion and/or color deviation of the image by an obtained aberration measurement value.

27. A lens evaluation method, comprising:
obtaining stack images by an imaging unit picking up images of a plurality of point light sources via an optical system to be evaluated every time a relative distance between the plurality of point light sources arranged on the plane or the imaging unit and the optical system is changed;
calculating a plurality of image positions from the plurality of point light source images in the obtained stack image; and
obtaining an aberration measurement value by fitting an aberration model function to the plurality of calculated image positions.

28. The lens evaluation method according to claim 27, wherein
the plurality of point light sources is configured to be able to select and switch a wavelength of outputted light.

29. The lens evaluation method according to claim 27, wherein
the plurality of point light sources comprises
a pin-hole with a diameter equal to or less than resolution of the optical system to be evaluated; and
an illumination unit for trans-illuminating the pin-hole.

30. The lens evaluation method according to claim 27, wherein
the plurality of point light sources comprises
a reflector with a diameter equal to or less than resolution of the optical system to be evaluated; and
an illumination unit for illuminating the reflector from top.

31. The lens evaluation method according to claim 27, wherein
the plurality of point light sources is arranged in a two-dimensional periodic lattice on the plane.

32. The lens evaluation method according to claim 27, wherein
the imaging unit is composed of two-dimensional imaging devices.

33. The lens evaluation method according to claim 27, wherein
the optical system to be evaluated and the imaging unit for picking up an object and obtaining its image are confocal optical devices for scanning one or more light condensation points.

34. The lens evaluation method according to claim 27, wherein
when calculating the image position,
setting a model function fitting range in order to calculate an image position from one point light source image in the stack image;

fitting a two-dimensional intensity distribution model function to each leaf image of the stack image within the set model function fitting range;

calculating the maximum value and its coordinates on the plane, of the two-dimensional intensity distribution model function fit to each of the leaf images;

fitting a first curve model function to the calculated coordinates on the plane of each of the leaf images;

fitting a second curve model function to the calculated maximum value of each of the leaf images;

calculating coordinates of the maximum value of the fit second curve model function; and obtaining a function value by assigning the coordinates of the calculated maximum value to the fit first curve model function.

35. The lens evaluation method according to claim 34, wherein
the two-dimensional intensity distribution model function is a two-dimensional Gaussian distribution function.

36. The lens evaluation method according to claim 27, wherein
when calculating the image position,
setting a model function fitting range in order to calculate an image position from one point light source image in the stack image;
calculating the maximum intensity value and its coordinates on the plane of each of the leaf images from each leaf image of the stack image within the set model function fitting range;
fitting a first curve model function to the calculated coordinates on the plane of each of the leaf images;
fitting a second curve model function to the calculated maximum value of each of the leaf images;
calculating the coordinates of the maximum value of the fit second curve model function; and
obtaining a function value by assigning the calculated coordinates of the maximum value to the first curve model function, fit to the calculated image on the plane of the each of the leaf images.

37. The lens evaluation method according to claim 34, further comprising:
modifying the plurality of calculated image positions by an average of the first curve model functions fit to the coordinates on the plane, of each of the leaf images; and
when obtaining the aberration measurement value, obtaining an aberration measurement value by fitting the aberration model function to the plurality of modified image positions instead of the plurality of calculated image positions.

38. The lens evaluation method according to claim 27, wherein
when calculating the image position,
calculating coordinates of a data point with the maximum intensity of each point light source image from the plurality of point light source images in the stack image.

39. The lens evaluation method according to claim 27, wherein
when calculating the image position,
calculating coordinates of center of gravity intensity of each point light source image from the plurality of point light source images in the stack image.

40. The lens evaluation method according to claim 27, wherein
the positional coordinates of the plurality of point light sources arranged on the plane are measured in advance.

41. The lens evaluation method according to claim 31, further comprising
obtaining the rotation angle at an installation position and amount of parallel movement of a point light source by fitting a plane model function specified by independent variables including indexes p and q of a lattice point to the plurality of image positions calculated from the plurality of point light source images arranged in the two-dimensional.

42. The lens evaluation method according to claim 41, further comprising
calculating positional coordinates of each of the plurality of point light sources arranged in a two-dimensional periodic lattice from the rotation angle at the installation position and amount of parallel movement of the point light source.

43. The lens evaluation method according to claim 40, wherein
when obtaining the aberration measurement value,
obtaining a measurement value by fitting an imaging model function in the lateral direction including lateral magnification to the position of the plurality of point light sources and the plurality of image positions calculated from the plurality of point light source images.

44. The lens evaluation method according to claim 40, wherein
when obtaining the aberration measurement value,
obtaining a measurement value by fitting an imaging model function in the lateral direction including lateral magnification and a distortion aberration coefficient to the position of the plurality of point light sources and the plurality of image positions in the lateral direction calculated from the plurality of point light source images.

45. The lens evaluation method according to claim 43, wherein
when calculating the image position,
calculating a plurality of image positions in the lateral direction from one piece of point light source image picked-up by the imaging unit in a focused state of the plurality of point light sources.

46. The lens evaluation method according to claim 27, wherein
when obtaining the aberration measurement value,
obtaining a measurement value by fitting an imaging model function in the longitudinal direction including an field curvature coefficient to the plurality of point light source positions and the plurality of image positions in the longitudinal direction calculated from the plurality of point light source images.

47. The lens evaluation method according to claim 28, wherein
when obtaining the stack image,
every time the distance is changed;
the wavelengths of the plurality of point light sources are switched,
images of the plurality of point light sources are picked up by the imaging unit for each wavelength, and
a plurality of stack images each with a different wavelength is obtained.

48. The lens evaluation method according to claim 47, further comprising:
calculating a difference between the plurality of image positions by the first wavelength and the plurality of image positions by the second wavelength which are calculated from the stack image by the obtained first wavelength and the stack image by the obtained second wavelength, respectively; and obtaining a chromatic aberration measurement value by fitting a chromatic aberration model function to a plurality of calculated differences.

49. The lens evaluation method according to claim 27, further comprising:

separating measurement values of the one part of the optical system and measurement values of the part other than the one part, by the aberration measurement values obtained in the plurality of rotation positions around the optical axis of the one part of the optical system to be evaluated.

50. The lens evaluation method according to claim 27, wherein the optical system to be evaluated has a microscopic optical system.

51. The lens evaluation method according to claim 49, wherein the one part of the optical system is an object lens of the microscopic optical system.

52. A computer-readable storage medium on which is recorded a lens evaluation program for enabling a computer of the lens evaluation device to execute a function, the function comprising:

a stack image acquisition function for obtaining stack images by an imaging unit picking up images of a plurality of point light sources via an optical system to be evaluated every time a relative distance between the plurality of point light sources arranged on the plane or the imaging unit and the optical system changes;

an image position calculation function for calculating a plurality of image positions from the plurality of point light source images in the stack image obtained by the stack image acquisition function; and an aberration measurement value acquisition function for obtaining an aberration measurement value by fitting an aberration model function to the plurality of image positions calculated by the image position calculation function.

* * * * *